(12) United States Patent
Clift

(10) Patent No.: US 11,159,833 B2
(45) Date of Patent: Oct. 26, 2021

(54) BUFFER MANAGEMENT FOR STORING FILES OF A RECEIVED PACKET STREAM

(71) Applicant: SONY CORPORATION, Tokyo (JP)

(72) Inventor: Graham Clift, San Diego, CA (US)

(73) Assignee: SONY CORPORATION, Tokyo (JP)

(*) Notice: Subject to any disclaimer, the term of this patent is extended or adjusted under 35 U.S.C. 154(b) by 20 days.

(21) Appl. No.: 16/199,117

(22) Filed: Nov. 23, 2018

(65) Prior Publication Data
US 2020/0169765 A1    May 28, 2020

(51) Int. Cl.
*H04N 7/173* (2011.01)
*H04N 21/2362* (2011.01)
*H04N 21/434* (2011.01)
*H04N 21/44* (2011.01)

(52) U.S. Cl.
CPC ..... *H04N 21/2362* (2013.01); *H04N 21/4345* (2013.01); *H04N 21/44004* (2013.01)

(58) Field of Classification Search
CPC ........... H04N 21/2362; H04N 21/4345; H04N 21/44004; H04L 49/9057; H04L 49/901; H04L 49/9005
USPC ....................................................... 725/116
See application file for complete search history.

(56) References Cited

U.S. PATENT DOCUMENTS

| | | | | |
|---|---|---|---|---|
| 6,233,648 B1* | 5/2001 | Tomita | ................. | G06F 3/0613 711/103 |
| 7,003,597 B2* | 2/2006 | Georgiou | ................ | H04L 49/90 710/53 |
| 7,526,623 B1* | 4/2009 | Rao | ........................ | G06F 12/023 711/159 |
| 7,957,423 B2* | 6/2011 | Crookes | ............. | H04N 21/4382 370/474 |
| 9,051,379 B2* | 6/2015 | Wolf | ....................... | A61K 38/17 |
| 10,531,149 B2* | 1/2020 | Zeng | ................ | H04N 21/44004 |

(Continued)

FOREIGN PATENT DOCUMENTS

| EP | 2 012 501 A2 | 1/2009 | |
|---|---|---|---|
| EP | 2012501 A2 * | 1/2009 | ........... H04L 1/0057 |

OTHER PUBLICATIONS

Yiling Xu et al., "DASH and MMT and Their Applications in ATSC 3.0", Special Topic, vol. 14, No. 1, Feb. 2016. pp. 39-49.

(Continued)

*Primary Examiner* — Jefferey F Harold
*Assistant Examiner* — Sahar Aqil Riaz
(74) *Attorney, Agent, or Firm* — Oblon, McClelland, Maier & Neustadt, L.L.P.

(57) ABSTRACT

A method for managing a buffer having a preset byte size for storing files includes determining a file identifier and length of an incoming file. The method includes determining that the incoming file will not fit into a space between a next write location and an end of the buffer. In response to the determination that the incoming file will not fit, the method includes, in a map, deleting each entry corresponding to a file at least partially overlapping the range of the incoming file and adding an entry in the map for the incoming file. The method further includes allocating a contiguous area in the buffer for the incoming file and then moving the next write location to the end of the allocated contiguous area, and receiving packets of the incoming file and storing the received packets into the allocated contiguous area.

18 Claims, 15 Drawing Sheets

(56) References Cited

U.S. PATENT DOCUMENTS

| | | | |
|---|---|---|---|
| 2006/0179462 A1 | 8/2006 | Willame et al. | |
| 2008/0005401 A1* | 1/2008 | Holley, II | G06F 5/10 710/52 |
| 2008/0063387 A1* | 3/2008 | Yahata | G11B 20/10 386/324 |
| 2009/0070502 A1* | 3/2009 | Noha | G06F 13/4213 710/100 |
| 2011/0295978 A1 | 12/2011 | Pazos et al. | |
| 2012/0030444 A1* | 2/2012 | Suehiro | G06F 3/0613 711/166 |
| 2012/0070130 A1 | 3/2012 | Willame et al. | |
| 2012/0076472 A1 | 3/2012 | Willame et al. | |
| 2013/0071092 A1 | 3/2013 | Willame et al. | |
| 2014/0201838 A1* | 7/2014 | Varsanyi | G06F 21/552 726/23 |
| 2014/0366076 A1* | 12/2014 | Suh | E04B 1/40 725/116 |
| 2015/0012957 A1* | 1/2015 | Suh | H04H 40/09 725/110 |
| 2015/0113102 A1* | 4/2015 | Pazos | H04H 20/426 709/219 |
| 2017/0220283 A1* | 8/2017 | Zhang | H04N 19/423 |
| 2018/0121364 A1* | 5/2018 | Edgar | G06F 12/1009 |
| 2019/0207696 A1* | 7/2019 | Chang | H04J 3/0682 |

OTHER PUBLICATIONS

International Search Report and Written Opinion dated Dec. 3, 2019, in PCT/IB2019/058667, 15 pages.

Paila, T. et al., "Flute-File Delivery over Unidirectional Transport", Internet Engineering Task Force, XP015086468, Nov. 6, 2012, 46 pages.

\* cited by examiner

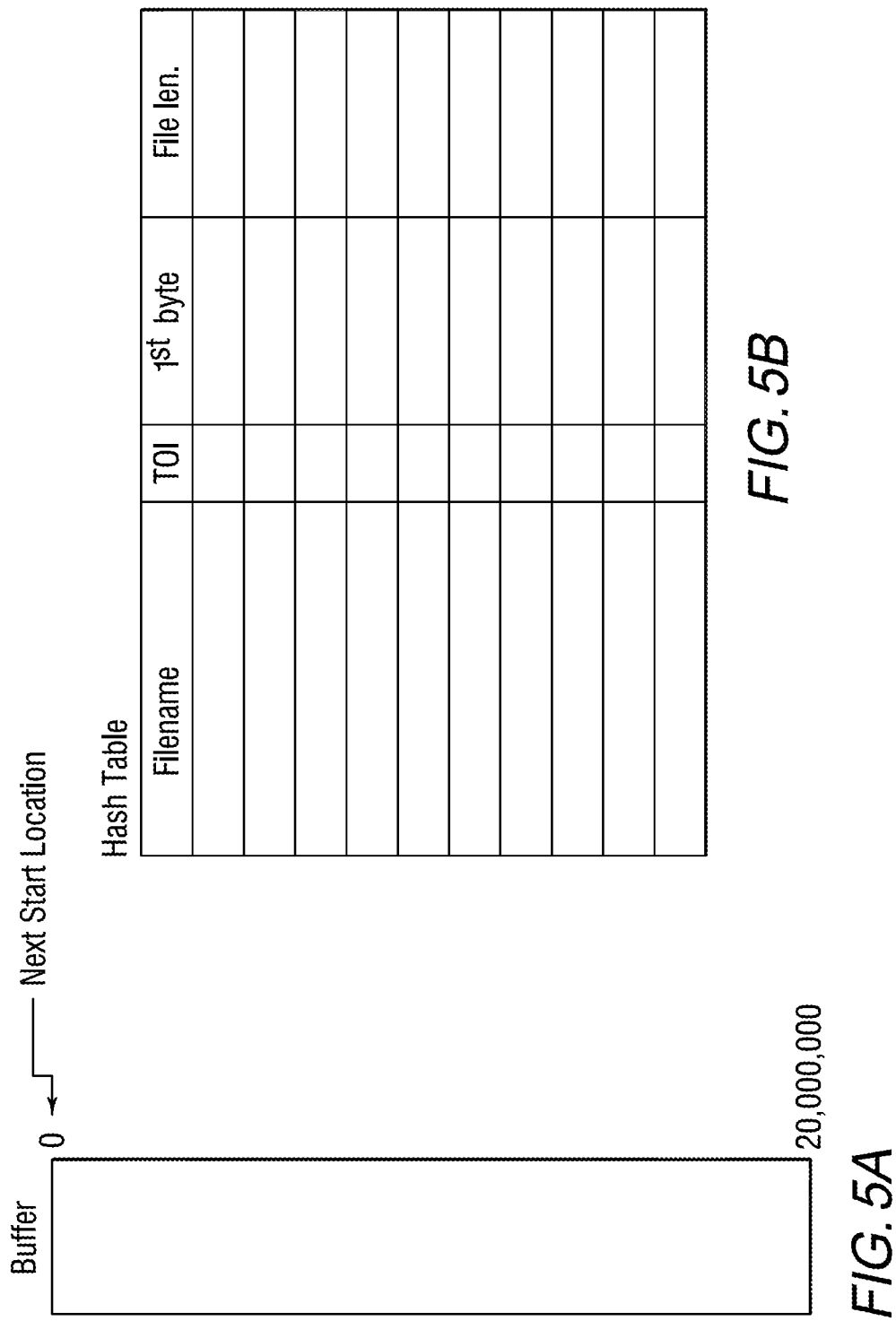

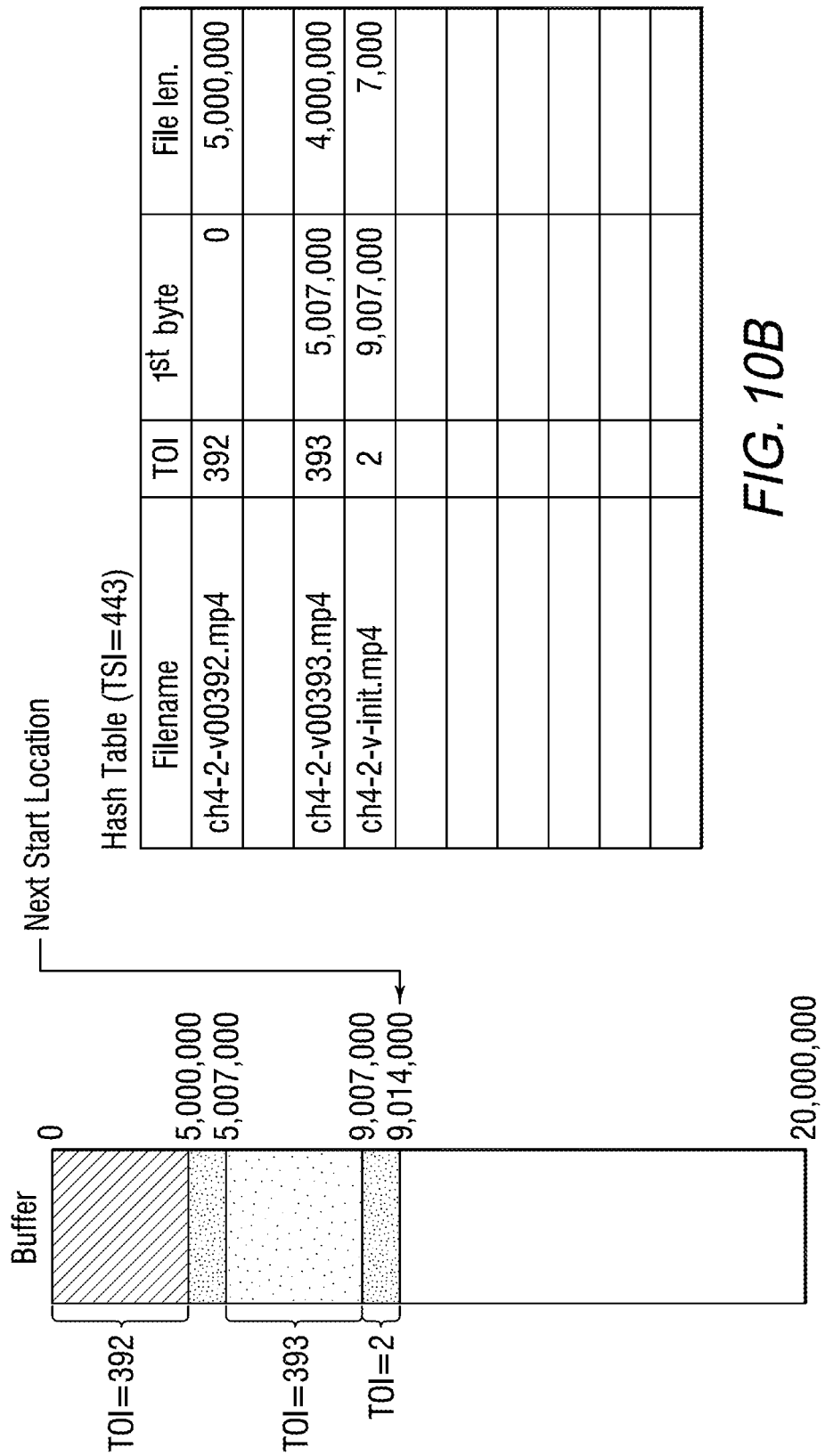

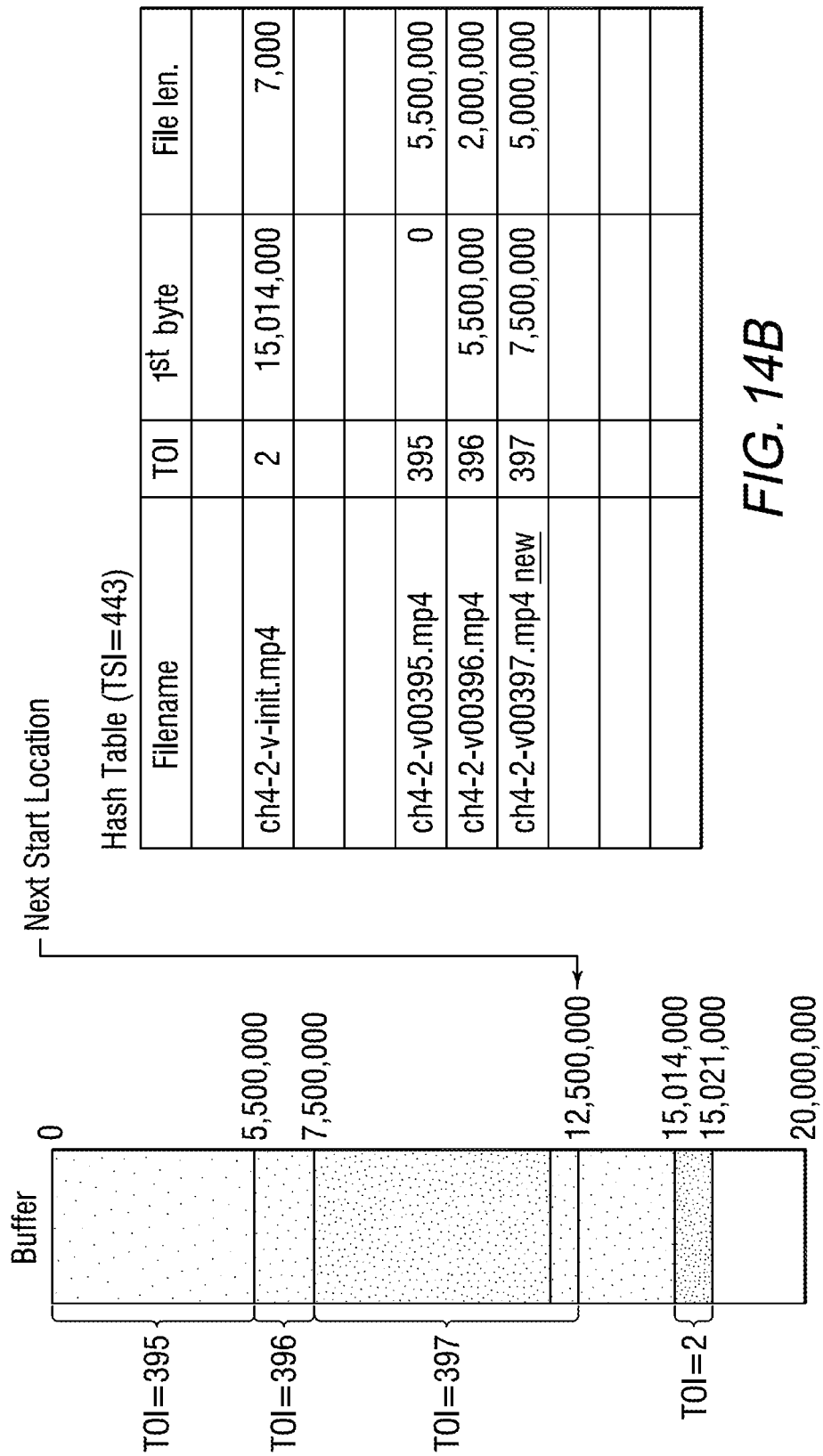

BUFFER MANAGEMENT FOR STORING FILES OF A RECEIVED PACKET STREAM

TECHNICAL FIELD

The present disclosure relates to a method, apparatus, and computer-readable storage medium that optimizes management of a limited memory resource while buffering packets of an incoming packet stream.

BACKGROUND

Various services and applications involve receipt of a packet stream. For example, the Advanced Television Systems Committee (ATSC) 3.0 standard defines a broadcast method in which the broadcaster delivers Internet Protocol (IP) packets across the transmission channel to receivers. Specifically, the ATSC standard defines the physical layer protocols in ATSC Standard A/322—Physical Layer Protocol (Doc. A/322:2017 dated Jun. 6, 2017) (hereinafter "A/322 Standard") and ATSC Standard A/321—System Discovery and Signaling (Doc. A/321:2016 dated Mar. 23, 2016) (hereinafter "A/321 Standard"), each of which are incorporated herein by reference in their entirety. These protocols are implemented in combination with the link-layer protocol ATSC Standard: Link-Layer Protocol (A/330) (Doc. A/330:2016 dated Sep. 19, 2016) (hereinafter "A/330 Standard"), which is incorporated herein by reference in its entirety, to deliver UDP/IP packets to the upper layers.

The upper-layer protocols of an ATSC 3.0 receiving device receive and interpret the UDP/IP packets from the lower layers where reception, demodulation, and lower-layer processing occurs, and are designed around many protocols common to Internet communications. These include the use of a modified File Delivery over Unidirectional Transport (FLUTE) protocol for file delivery called ROUTE (Real-Time Object Delivery over Unidirectional Transport), which is described in ATSC Proposed Standard A/331 (Doc. S33-331r1 dated Nov. 7, 2017) (hereinafter "A/331 Standard"), incorporated herein by reference in its entirety, and many other Internet protocols developed by the Internet Engineering Task Force (IETF). The A/331 Standard also defines UDP/IP-based transport protocols.

An ATSC 3.0 television receiver can manage the reception of streaming data at rates of tens of megabits per second in order to process signaling and select packets for decoding and presentation to the user. The objects delivered within the broadcast stream are files. A few of those, mainly ones carrying signaling data, will fit into a single UDP/IP packet, while others may be megabytes in length and are thus fragmented into plural UDP/IP packets for delivery.

The design of an ATSC 3.0 receiver may address several memory-related considerations. For example, the ATSC 3.0 receiver has limited memory and therefore its operation should optimize memory usage. Another limited resource is CPU cycles, so storage and processing of received data in the ATSC 3.0 receiver should minimize the number of CPU cycles. Other considerations include avoidance of memory leaks and appropriate use of volatile memory (e.g. RAM) and non-volatile memory (e.g. FLASH), including appropriate transfer of data from volatile to non-volatile memories. Finally, the ATSC 3.0 receiver should be designed to support acceptable performance and user experience when the available memory is insufficient. The present disclosure describes a strategy which addresses these challenges.

SUMMARY

According to an embodiment of the present disclosure, there is provided a method for managing a buffer having a preset byte size for storing files received via packet stream. The method includes determining a file identifier and length of an incoming file and determining that the incoming file will not fit into a space between a next write location and an end of the buffer. In response to the determination that the incoming file will not fit into the space between the next write location and the end of the buffer, the method includes, in a map that identifies one or more files stored in the buffer, deleting each entry corresponding to a file at least partially stored in an area of the buffer starting at an initial write location and having a size equal to the length of the incoming file. Together with the deleting, the method includes adding an entry in the map including the file identifier and the length of the incoming file in association with the initial write location in the buffer and allocating a contiguous area in the buffer starting at the initial write location in the buffer and having the size equal to the length of the incoming file and then moving the next write location to the end of the allocated contiguous area. Finally, the method includes receiving packets of the incoming file and storing the received packets into the allocated contiguous area.

According to an embodiment of the present disclosure, there is provided a buffer management apparatus for storing files received via packet stream in a buffer having a preset byte size. The buffer management apparatus is configured to determine a file identifier and length of an incoming file and determine that the incoming file will not fit into a space between a next write location and an end of the buffer. In response to the determination that the incoming file will not fit into the space between the next write location and the end of the buffer, the buffer management apparatus is configured to, in a map that identifies one or more files stored in the buffer, delete each entry corresponding to a file at least partially stored in an area of the buffer starting at an initial write location and having a size equal to the length of the incoming file. Together with the deleting, the buffer management apparatus is configured to add an entry in the map including the file identifier and the length of the incoming file in association with the initial write location in the buffer and allocate a contiguous area in the buffer starting at the initial write location in the buffer and having the size equal to the length of the incoming file and then move the next write location to the end of the allocated contiguous area. Finally, the buffer management apparatus is configured to receive packets of the incoming file and store the received packets into the allocated contiguous area.

According to an embodiment of the present disclosure, there is provided a non-transitory computer-readable storage medium storing computer-readable instructions thereon, which, when executed by a processor, cause the processor to perform a method for managing a buffer having a preset byte size for storing files received via packet stream. The method includes determining a file identifier and length of an incoming file and determining that the incoming file will not fit into a space between a next write location and an end of the buffer. In response to the determination that the incoming file will not fit into the space between the next write location and the end of the buffer, the method includes, in a map that identifies one or more files stored in the buffer, deleting each entry corresponding to a file at least partially stored in an area of the buffer starting at an initial write location and having a size equal to the length of the incoming file. Together with the deleting, the method includes adding an entry in the map including the file identifier and the length of the incoming file in association with the initial write location in the buffer and allocating a contiguous area in the buffer starting at the initial write location in the buffer and having the size equal to the length of the incoming file and then moving the next write location to the end of the allocated contiguous area. Finally, the method includes receiving packets of the incoming file and storing the received packets into the allocated contiguous area.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A and 5B illustrate an exemplary buffer and corresponding hash table.

FIGS. 10A and 10B illustrate an exemplary buffer and corresponding hash table.

FIGS. 14A and 14B illustrate an exemplary buffer and corresponding hash table.

DETAILED DESCRIPTION

Figure 1:
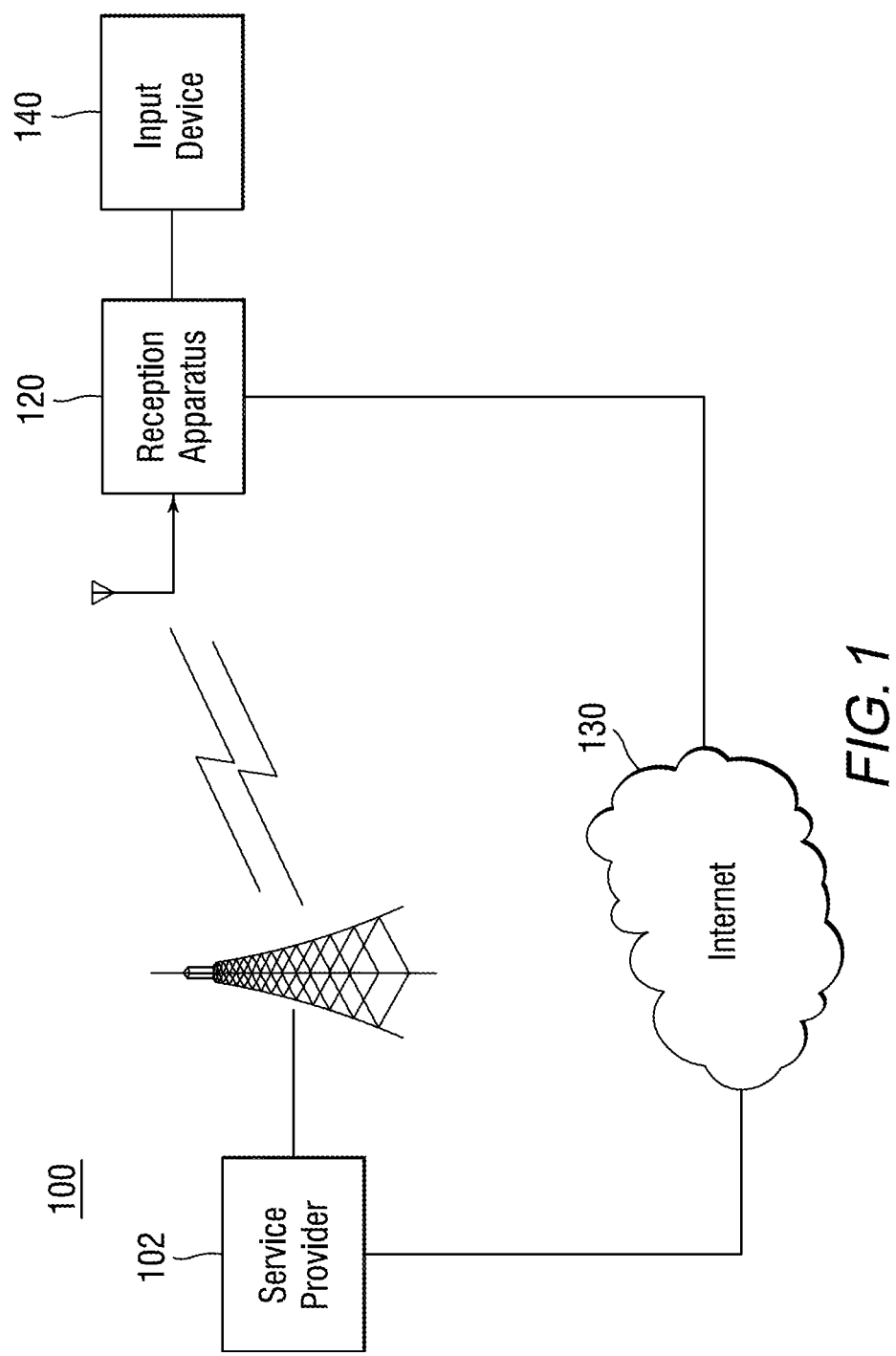
FIG. 1 illustrates an exemplary digital television broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a buffer management system for storing files of a received packet stream.

Embodiments of the present disclosure are directed to a method for collecting and storing files received in a television reception apparatus (e.g., ATSC 3.0 receiver). The method uses one or more circular buffers that are managed such that CPU cycles are minimized and operation is optimized, for example, based on the characteristics of ATSC 3.0 broadcast transmission. One such characteristic of ATSC 3.0 transmission is that certain files are repeated often. One example of files that are repeated often are "Initialization Segment" (IS) files needed to begin decoding each component of streaming media (e.g., video elementary stream, audio elementary stream, etc.).

Embodiments of the present disclosure are based on the following concepts.

(1) The length of incoming files is known in advance, for example due to signaling defined in the A/331 Standard.

(2) Each packet carrying a fragment of a file includes an offset parameter that indicates the offset from the beginning of the file to the point in the file where the fragment belongs. The offset parameter may be used by the television reception apparatus to determine where in the buffer to place the fragment, thereby enabling out-of-order reception of the fragments.

(3) A file is written into contiguous bytes of the buffer without being split among non-contiguous areas of the buffer. Accordingly, no "wrapping" occurs in which the beginning of the file is written toward the end of the buffer and the rest of the file is written at the head of the buffer. That is, because "wrapping" results in sections of the file in non-contiguous areas of the buffer, namely at the end of the buffer and at the beginning of the buffer, "wrapping" is not performed in the presently disclosed embodiments.

(4) Although "wrapping" as described above in (3) is not performed, files may be written circularly in the sense that, if a given file cannot fit in the buffer area between the current writing position and the end of the buffer, one or more files at the beginning of the buffer may be deleted to make room and the current writing position is moved to, or towards, the beginning of the buffer.

(5) Each buffer is sized appropriately, so that the number of files needed to maintain decoding and synchronized presentation of video, audio, and captions can be stored.

(6) If a new file is received that is a duplicate of a file already in the buffer, the area of the buffer storing the previously received file may be released after the last byte of the new file is stored in the buffer.

Each circular buffer used in embodiments of the present disclosure occupies a fixed, contiguous memory range in memory (e.g., RAM) and stores file objects. For each buffer, a pointer (hereinafter "Next Start Location") may identify a memory location where the first byte of the next new file will be written. Each buffer has an assigned unique buffer number and an associated hash table (or other table or data structure) listing or otherwise identifying entries representing files in the buffer. Each entry in the hash table of a buffer corresponds to one file stored in the buffer and includes, in one embodiment, at least the following parameters regarding the file: the name of the file, the Transport Object Identifier (TOI) associated with transport of the file according to the A/331 Standard, the location in the buffer of the first byte of the file, and the total length of the file. The TOI in A/331 performs the same function as the TOI value in the FLUTE standard defined in RFC 6726, as the transport protocol defined in A/331 is based on FLUTE.

FIG. 1 is an exemplary digital television broadcast system 100 for providing access to television content. The system includes a service provider 102, a reception apparatus 120, and an input device 140. The reception apparatus 102 may be configured to receive data via an antenna. The reception apparatus 102 may further be configured to connect to the Internet 130 to receive data.

In one example, the service provider 102 is a broadcaster of television content and the reception apparatus 120 may be any device that is configured to operate as a television such as a flat screen TV, laptop, tablet, or smart phone. The input device 140 may be physically or wirelessly connected to the reception apparatus 120 and may be any device suitable to operate the reception apparatus 120 such as a remote with numeric keys and/or alphanumeric keys, a QWERTY keyboard, or a smartphone executing an application compatible with the reception apparatus 120. The keys on the input device 140 may be either physical buttons or the digital representation of numeric or alphanumeric keys on a touchscreen. Embodiments of the present disclosure may be utilized to provide access to other broadcast content (e.g., executable applications such as HTML5 applications). The service provider 102 transmits a broadcast stream that includes television content and may be delivered via a digital television broadcast signal.

The service provider 102 (e.g., a broadcaster entity or broadcast station), in one embodiment, operates a service distribution system that includes a transmission apparatus with a transmitter that is configured to transmit content, applications, and/or services in a data stream (e.g., a broadcast stream) to the reception apparatus 120. The transmitter is configured to provide the data stream to the reception apparatus 120, for example via a digital terrestrial broadcast. In other examples, the data stream may be transmitted to the reception apparatus 120 over one or a combination of the digital terrestrial broadcast, a mobile phone network, a broadband network such as the Internet, a cable network, and a satellite link. The service distribution system may use any one or a variety of transmission techniques to communicate the data stream to the reception apparatus 120.

The service distribution system according to one embodiment includes a source encoder, a channel encoder, and a modulator. The source encoder includes data, audio, and video encoders to compress the audio, video, signaling, control or other data received from a source. The channel encoder randomizes, interlaces, channel codes, and frame maps the compressed media and signaling data. For example, the channel encoder includes a frame builder that forms many data cells into sequences to be conveyed on orthogonal frequency-division multiplexing (OFDM) symbols. The modulator (e.g., a multiplexer) converts the processed digital data into modulation symbols, which can be, for example OFDM symbols. The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital-to-analog (D/A) converter. Then, up-conversion, RF amplification, and over-the air broadcasting are performed to transmit a broadcast stream.

Certain components of the transmission apparatus or the reception apparatus may not be necessary in other embodiments. Details of an OFDM transmitter and receiver may be found, for example, in the DVB-T2 standard (ETSI EN 302 755 V1.4.1 dated Jul. 1, 2015) (incorporated herein by reference), the A/322 Standard and the A/321 Standard.

Figure 2:
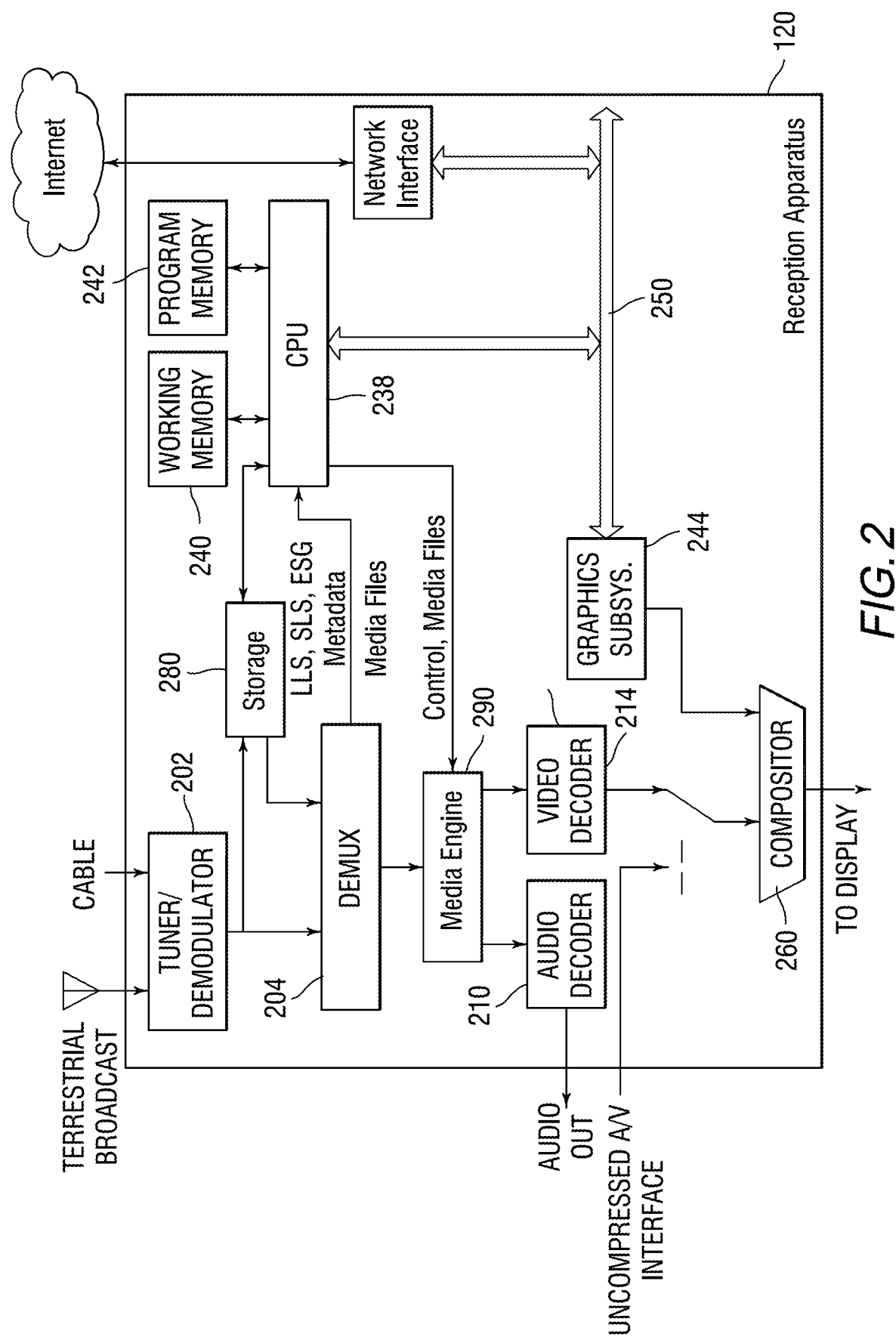
FIG. 2 illustrates an exemplary reception apparatus.

FIG. 2 illustrates an exemplary reception apparatus 120, which is configured to access television content and broadcaster applications. The reception apparatus 120 may be a fixed or mobile device such as a television set, a set top box, smartphone, tablet computer, laptop, portable computer, or any other device configured to receive television content. Further, the reception apparatus 120 may be a digital television receiver that is incorporated in a vehicle or any of the fixed or mobile devices described above.

The reception apparatus 120 includes receiver circuitry that is configured to receive a data stream (e.g., a broadcast stream) from one or more service providers 102 and processing circuitry that is configured to perform various functions of the reception apparatus 120. In one embodiment, a tuner/demodulator 202 receives broadcast emissions containing the broadcast stream. Depending on the embodiment, the reception apparatus 120 may alternatively or additionally be configured to receive a cable television transmission or a satellite broadcast.

When an ATSC 3.0 broadcast emission has been acquired by the tuner/demodulator 202, incoming data packets may be buffered according to the presently described embodiments in working memory 240. In some embodiments, certain files buffered according to the presently described management strategy are selectively moved, for example to persistent storage 280, to a section of working memory 240 not occupied by buffers and hash maps, or to another RAM. This selective movement of files to memory other than buffers in which the files are overwritten applies to files which may be referenced (or accessed again) at a later time. Examples include signaling tables and files associated with broadcaster applications. Files associated with media (e.g. video, audio, and captions) may be rendered and presented directly from the buffer in which they were received, and not moved to persistent storage where they could be replayed at a later time. For receiving devices which implement personal video recorder (PVR) functionality however, media files would be moved to persistent storage for time-shifted playback.

A demultiplexer 204 may demultiplex the data stream using any necessary files from storage 280, and deliver the demultiplexed data to media engine 290 for decoding into separate audio and video (A/V) streams. Files that are outputted by the demultiplexer 204 such as metadata, Low Level Signaling (LLS) and the Service Layer Signaling (SLS) files, media files, and Electronic Service Guide (ESG) files may be provided to the CPU 238 for processing. The audio is decoded by an audio decoder 210 and the video is decoded by a video decoder 214. Further, uncompressed A/V data may be received via an uncompressed A/V interface (e.g., a HDMI interface), if available.

The reception apparatus 120 generally operates under control of at least one processor, such as the CPU 238, which is coupled to the persistent storage 280, a working memory 240, program memory 242, and a graphics subsystem 244 via one or more buses (e.g., bus 250). The CPU 238 is configured to generate a user interface for outputting the received media to a user according to one embodiment. The graphics outputted by the graphics subsystem 244 are combined with video images by the compositor and video interface 260 to produce an output suitable for display on a video display.

The CPU 238 operates to carry out functions of the reception apparatus 120 including executing script objects (control objects) contained in a broadcaster application (e.g., HTML5 application), native broadcaster application, etc., using for example an HTML5 user agent stored in the program memory 242.

In one embodiment, the collection of files making up the broadcaster application can be delivered over broadcast as packages, via the ROUTE protocol described in ATSC Standard A/331 (Doc. A/331:2017 dated Dec. 6, 2017) (hereinafter "A/331 Standard") for example and incorporated by reference in its entirety. An exemplary broadcaster application is described in ATSC Standard A/344 (Doc. A/344:2017 dated Dec. 18, 2017) (hereinafter "A/344 Standard"), which is incorporated by reference in its entirety.

The CPU 238 may be coupled to any one or a combination of the reception apparatus 120 resources to centralize control of one or more functions, in certain embodiments. In one embodiment, the CPU 238 also operates to oversee control of the reception apparatus 120 including the tuner/demodulator 202 and other television resources.

In one embodiment, the buffering of files received through incoming data packets is controlled by the CPU 238. The buffering management process 300 is described with reference to FIG. 3. The process begins with step S30 of receiving a packet. The packet may be the first packet received for an initialized buffer and corresponding hash table or may be one of subsequent packets received in a packet stream.

In the former scenario of receiving a first packet, a buffer of a predetermined byte size is initialized and a hash table corresponding to the buffer is created. In the initial state, both the buffer and the hash table are empty and the Next Start Location pointer is initialized to the head of the buffer. Once the receiver is tuned to an ATSC 3.0 broadcast emission and the signaling tables have been retrieved, Layered Coding Transport (LCT) Channels associated with a requested service will have been identified. For example, the LCT Channels may be identified using a Service List Table (SLT) and Service Layer Signaling (SLS) tables including the Service-based Transport Session Instance Description (S-TSID), as defined by the A/331 standard.

Each LCT Channel is associated with a specific combination of source and destination IP address and port values, and TSI value. More than one LCT channel may be carried within IP packets of the same source and destination IP address and port values. In one embodiment, the TSI value distinguishes the particular LCT Channel. That is, each received LCT Channel has a corresponding initialized buffer and hash table, which store and manage packets having the TSI value of the LCT Channel.

The ATSC A/331 Standard defines two different possible transport protocols: ROUTE/DASH and MPEG MMT. Embodiments of the presently disclosed buffer management process are applicable to both of these transport protocols. The MPEG DASH standard is described in ISO/IEC 23009-1:2014, "Information technology—Dynamic adaptive streaming over HTTP (DASH)—Part 1: Media presentation description and segment formats," International Organization for Standardization, 15 May 2014 (hereinafter "MPEG DASH standard"), the entire contents of which are incorporated by reference.

Figure 3:
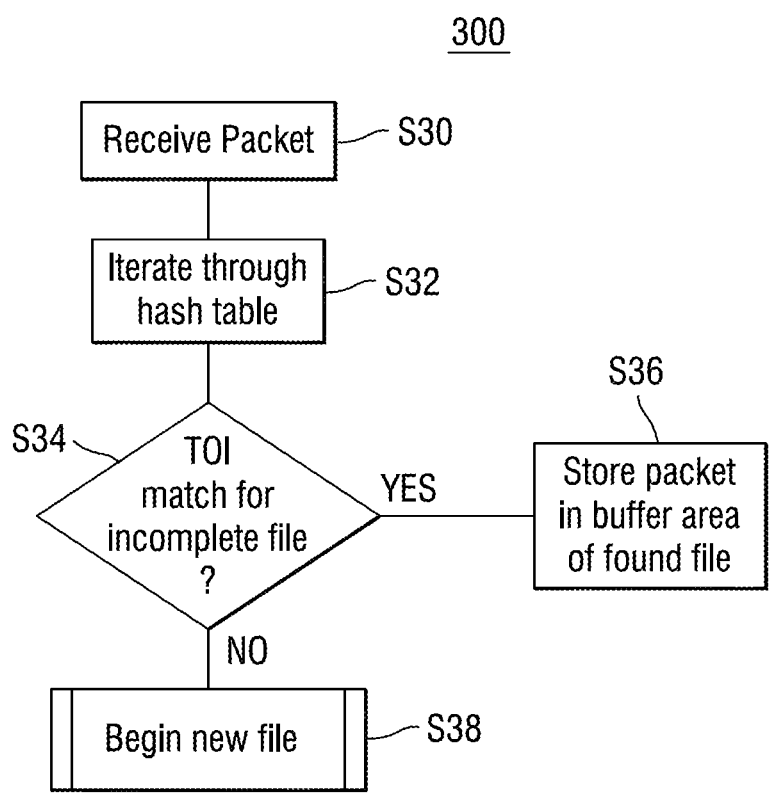
FIG. 3 illustrates an exemplary process performed in the reception apparatus.

Returning to step S30 of the buffer management process 300 of FIG. 3, the step following receipt of the packet is iteration through the corresponding hash table in step S32. The purpose of the iteration through the hash table is to determine whether an entry in the hash table exists that has the same TOI number as the received packet and is labeled incomplete, in step S34. In some embodiments, step S34 includes determining whether an entry in the hash table exists that has the same file identifier (e.g., file name and TOI), for example in embodiments in which the TOI number itself does not uniquely identify the file name. Should an entry in the hash table be found that matches the name and TOI number of the received packet and that is labeled incomplete, this indicates that the received packet is a segment of a file that has already been partially received and buffered. Accordingly, the appropriate buffer space has been allocated to the file and the received packet belongs in that allocated buffer space.

Therefore, the YES branch from step S34 in the process 300 leads to step S36 in which the received packet is stored in the allocated buffer area of the file corresponding to the found entry in the hash table. The found entry in the hash table indicates the location of the first byte of the space allocated for the file. As discussed above, the received packet includes an offset parameter that indicates the offset from the beginning of the file to the point in the file where the fragment of the received packet belongs. By adding the offset parameter of the received packet to the location of the first byte of the file in the buffer, the appropriate location in the buffer for the file fragment of the received packet can be determined and the file fragment can be stored in the buffer in step S36.

In the case that the file fragment completes the file stored in the buffer, the "incomplete" label is removed from the entry in the hash table corresponding to the completed file. When the last file fragment is received for the file and the "incomplete" label is removed from the entry in the hash table, a search of the hash table is performed to determine if another file of the same name already exists in the hash table, meaning that the same file has been previously received and buffered. If such a duplicate entry is found in the hash table, the duplicate entry is removed from the hash table. While bytes of the earlier received duplicate file remain in the buffer and are not erased, the entry corresponding to this file is removed from the hash table such that the hash table does not include any reference to the area of the buffer in which the earlier received duplicate file is written.

Coming back to step S34, if an entry in the hash table that matches the TOI number of the received packet and that is labeled incomplete is not found, this indicates one of two possibilities. If there is no entry in the hash table with the TOI number of the received packet, then the packet is the first packet of a new incoming file. Alternatively, if an entry exists in the hash table with the same TOI number as the received packet, but the entry is not labeled incomplete, this indicates that a previous transmission of the same file has been fully buffered at an earlier point and the received packet is the first packet of a new transmission of the file.

In either of the above cases, a process to begin a new file is performed in step S38 in the NO branch of step S34, which indicates that an entry in the hash table that matches the TOI number of the received packet and that is labeled incomplete has not been found. The process of beginning a new file is described with reference to FIG. 4 as the begin new file operation 400.

The begin new file operation starts at step S40 and moves to step S41 to determine whether the new file will fit into the remaining space in the buffer. In order to make this determination, the size of the new file, which is received in advance through signaling, as described above for example in the A/331 Standard, is added to the byte location of the Next Start Location pointer. If the resulting location is beyond the end of the buffer, then a determination is made in step S41 that the new file will not fit into the remaining space in the buffer without first making more space available. If the size of the new file is larger than the buffer area remaining between the location of the Next Start Location pointer and the end of the buffer, then the space to be made will be taken from the head of the buffer.

On the other hand, if the location resulting from adding the size of the new file to the byte location of the Next Start Location pointer is not beyond the end of the buffer, the new file is determined to fit into the remaining space in the buffer in step S41 with no need to remove any entries in the hash table. In this case, the process moves to step S46 to determine whether the range of the new file will overlap other files listed in the hash table.

In step S46, it is known that the file will begin to be written at the Next Start Location pointer because it was determined in step S41 that the file will fit between the Next Start Location and the end of the buffer. Accordingly, the range of the new file in step S46 begins at the Next Start Location and extends the length of the new file. Given this range of the new file, it is determined in step S46 whether any file(s) listed in the hash table overlap with the range of the new file. In this process, the allocated contiguous buffer area of each entry in the hash table is determined to begin at the byte number indicated in the hash table field of the location of the first byte of the file and is determined to be equal in length to the file length field of the hash table entry. Then, it is determined whether the associated contiguous buffer area for each respective hash table entry overlaps with the range of the new file. In other words, step S46 determines whether any file(s) listed in the hash table would be overwritten, partially or wholly, if the new file were stored in the buffer.

If it is determined in step S46 that the range of the new file will not overlap files in the hash table, the process moves to step S47, in which an area in the buffer is allocated for the new file started at the Next Start Location. As part of the allocation of step S47, a new entry is created in the hash table based on the information about the new file that is received in advance through signaling and is included in the packet received in step S30. For example, the name of the file, the TOI of the file, and the length of the file are populated as a single entry in the hash table. The location of the first byte of the file is populated in the hash table as the current location of the Next Start Location pointer. Finally, if the packet received in step S30 does not contain the entire file, the new entry in the hash table is labeled incomplete.

Accordingly, in step S47, an area in the buffer is allocated for the new file based on the created entry in the hash table. The allocated buffer area is contiguous and begins at the current location of the Next Start Location pointer. The size of the allocated buffer area is the length of the file indicated in the newly created hash table entry. Upon allocation of the area in the buffer in step S47, the location of the Next Start Location pointer is moved in step S48 to the end of the allocated area from the beginning of the allocated area, or in the case that the new file would exactly fill to the end of the buffer, to the head of the buffer. In the present disclosure, "head of the buffer" is used to denote a location near the beginning of the buffer, which may be byte 0, or another location close to byte 0.

Then, the packet received in step S30 is stored in the allocated area in step S49. Because the packet received in step S30 does not necessarily carry the first fragment of the new file, the same offset determination is performed in step S49 as in step S36. Namely, the received packet includes an offset parameter that indicates the offset from the beginning of the file to the point in the file where the fragment of the received packet belongs. By adding the offset parameter of the received packet to the location of the first byte of the file in the buffer, the appropriate location in the buffer for the file fragment of the received packet can be determined and the file fragment can be stored in the buffer in step S49.

Coming back to step S46, the YES branch of this step is followed if it is determined in step S46 that the range of the new file would overlap the allocated buffer areas of file(s) stored in the hash table. As described above, the range of the new file begins at the Next Start Location and extends the length of the new file and allocated buffer areas of each file in the hash table can be determined based on the information stored in the hash table. In the case that the allocated buffer area of at least one file in the hash table is found to overlap the range of the new file, step S50 is performed. In step S50, the file or files in the hash table found to overlap the range of the new file are deleted from the hash table. This allows the process to move to step S47 for allocation of a buffer area for the new file, without having entries in the hash table that overlap the allocated area of the new file. Thereafter, steps S48 and S49 are performed as described above.

Coming back to step S41, the NO branch of this step is followed if the new file is determined not to fit into the remaining space in the buffer. As described above, this occurs when the size of the new file is larger than the buffer area remaining between the byte location of the Next Start Location pointer and the end of the buffer. In this case, the "make space" operation is performed in step S42.

The make space operation begins at step S42 as a result of a determination, in step S41, that the new file will not fit into the remaining space in the buffer. Accordingly, the range of the new file will start at the beginning of the buffer or at an initial write buffer location toward the beginning of the buffer and will extend the length of the new file. From this starting point, the range of the new file will extend the length of the new file in a contiguous block.

As described above, in some embodiments, the new file will be written at an initial write buffer location that is not necessarily at the very beginning of the buffer (byte 0), but that can nonetheless accommodate the length of the new file. As previously noted, "head of the buffer" is used to denote a location near the beginning of the buffer, which may be byte 0, or another location close to byte 0. That is, the range of the new file in some embodiments will not begin at byte 0, but at some other initial write buffer location, and will extend the length of the new file. In one embodiment, the range of the new file will begin at a byte number that corresponds to the first byte of a previously stored file or group of files that should be overwritten in order to store the new file. In another embodiment, the range of the new file will begin at a byte number that is determined by shifting the Next Start Location by the number of additional bytes needed to store the new file.

Next, in step S43, each entry in the hash table that overlaps with the range of the new file is identified. Because the new file was found in step S41 not to fit into the remaining space of the buffer, the range of the new file begins at an initial write buffer location, which may be at or near the head of the buffer and extends the length of the new file, as described above.

In step S43, for each entry in the hash table, the associated contiguous area of the file in the buffer is determined to begin at the byte number indicated in the hash table field of the location of the first byte of the file and is determined to be equal in length to the file length field of the hash table entry. Then, it is determined whether the associated contiguous area for each respective hash table entry overlaps with the range of the new file. In other words, step S43 identifies all files listed in the hash table that would be overwritten, partially or wholly, if the new file were stored in the buffer.

In step S44, all hash table entries identified in step S43 are deleted from the hash table. This is done in preparation for writing the new file, thereby partially or wholly overwriting the files whose entries are deleted from the hash table.

Upon completion of step S44, the process moves to step S45, in which an area in the buffer is allocated for the new file starting at an initial write location. As part of the allocation in step S45, a new entry is created in the hash table. Based on the information about the new file that is received in advance through signaling and is included in the packet received in step S30, the name of the file, the TOI of the file, and the length of the file are populated as a new entry in the hash table. The initial write location is indicated in the new entry as the location of the first byte of the file. As described above, in some embodiments, the initial write location is located at the head of the buffer to optimize buffer capacity. In other embodiments, the initial write location is located at another buffer location, as long as the space between the initial write location and the end of the buffer can accommodate the size of the new file. Finally, if the packet received in step S30 does not contain the entire file, the new entry in the hash table is labeled incomplete.

Upon completion of step S45, the location of the Next Start Location pointer is then moved to the end of the allocated area in step S48 and the packet received in step S30 is stored in the allocated area in step S49. As described above, "out of order" reception of packets is accommodated in step S49 by adding the offset parameter of the received packet to the location of the first byte of the file in the buffer (which is either the location of the Next Start Location pointer if the buffer area was allocated in step S47 or the initial write location if the buffer area was allocated in step S45). According to such addition, the appropriate location in the buffer for the file fragment of the received packet can be determined and the file fragment can be stored in the buffer in step S49.

Next, examples of the operation of the buffer and hash table according to the processes described above with references to FIGS. 3 and 4 will be provided. FIGS. 5A and 5B show an initial state of the buffer and corresponding hash table. In this example, the predetermined byte size of the buffer is 20,000,000 bytes. In some embodiments, the buffer is a contiguous memory block in RAM. In the initialized state of FIG. 5A, the location of the Next Start Location pointer is the head of the buffer. In the following examples, byte numbers of 0 to 20,000,000 indicate relative locations within the contiguous memory block of the buffer and are not indicative of absolute memory addresses or locations within the RAM in which the buffer is located.

As described above, the initialized buffer and hash table correspond to a received LCT Channel having packets with the same TSI value. In the present example of FIGS. 5A and 5B, a selected service includes a ROUTE session that defines three LCT Channels. Files of the video component of the service are transported on an LCT Channel associated with a TSI value 443 and are to be buffered in the initialized buffer of FIG. 5A in the present example. The TSI value is included in the hash table identifier in some embodiments.

Figures 6A, 6B:
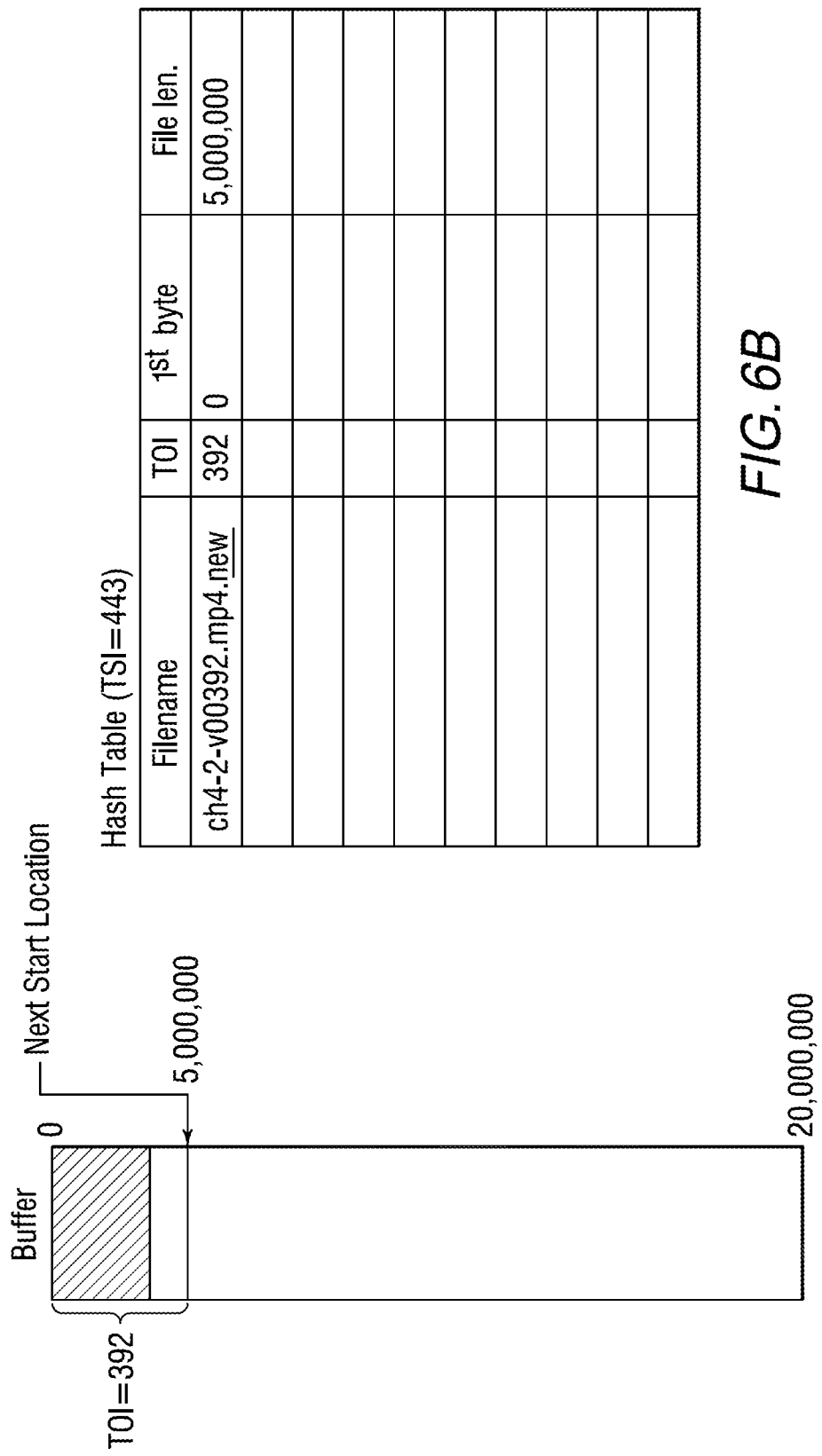
FIGS. 6A and 6B illustrate an exemplary buffer and corresponding hash table.

FIGS. 6A and 6B show the result of performing the process 300 based on information about a video DASH Media Segment file named "ch4-2-v00392.mp4" derived by receiving and processing signaling regarding the file. In one embodiment, the signaling is an Extended File Delivery Table (EFDT) according to the A/331 Standard found in the S-TSID associated with the selected service. Packets carrying this file have begun to be stored in the buffer in the exemplary embodiment of FIG. 6A.

For the first packet received corresponding to the file ch4-2-v00392.mp4, the determination of step S34 is NO because the hash table is still in the initialized state of FIG. 5B and there is no incomplete entry having the same TOI number as the file ch4-2-v00392.mp4. In the new file operation 400, the file is determined to fit into the remaining space in the buffer in step S41 because the buffer is in the initialized state of FIG. 5A. FIG. 6B shows the creation of a new entry for this file indicating that the first byte of the file has been stored at byte 0, which was the location of the Next Start Location pointer prior to reception of the file, and that the file is 5,000,000 bytes in length.

FIG. 6A shows a state of the buffer in which the area in the buffer (indicated by TOI=392) has been allocated to the new file and location of the Next Start Location has been moved to the end of the allocated area (i.e., to byte 5,000, 000). The shaded region of the allocated area indicates a state in which some packets carrying the file have been received and stored in the buffer, but the file is not yet complete.

Initially, and until all bytes associated with the file have been retrieved, the filename string received in the signaling (for example, in EFDT.FDT-Instance.File@Content-Location) is saved in the hash table with ".new" appended, as shown in FIG. 6B. The presence of ".new" is a way of indicating the hash table entry as incomplete and indicates that the entry in the hash table represents a file whose reception in the buffer is incomplete. Another identifier can be appended or a separate parameter can be added to the hash table to indicate that the reception of the file has not been completed.

Accordingly, in the processing of all subsequent (i.e., not first received) packets carrying the file, an incomplete entry in the hash table having a TOI match is found in step S34 because the hash table of FIG. 6B now includes the incomplete entry for this file. Therefore, the subsequent received packets carrying the file are stored according to step S36 in the allocated area shown in FIG. 6A.

When the last byte of the file has been received, the ".new" portion of the filename is deleted in the hash table and the file can be accessed at the recorded location of the first byte. When the ".new" portion of the filename is deleted, thereby labeling the file as complete, a check is made to see if another entry of the same filename exists in the hash table. If a duplicate is found, the earlier entry in the hash table with the same filename is removed, as described above. In one embodiment, a new version of a file has a different TOI number than a previous version.

Figures 7A, 7B:
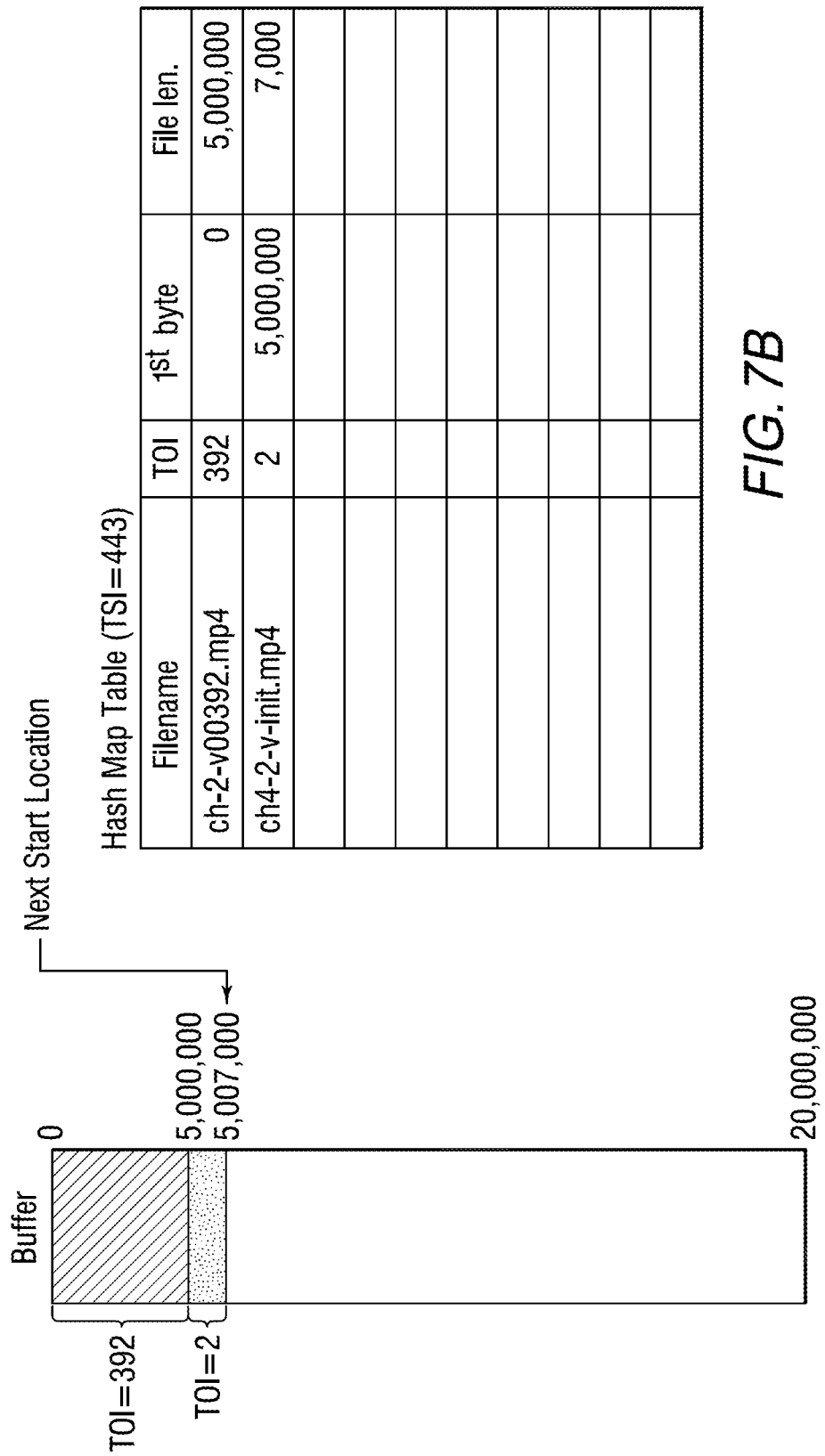
FIGS. 7A and 7B illustrate an exemplary buffer and corresponding hash table.

In the exemplary embodiment of FIGS. 7A and 7B, the first file (ch4-2-v00392.mp4) has been fully received, which is indicated by the lack of ".new" at the end of the filename and the fully shaded state of the allocated buffer area between bytes 0 and 5,000,000. Information about a second file has been discovered, for example by parsing an EFDT.

As above, process 300 is performed for the first received packet of the second file. The length of the second file is signaled as being 7,000 bytes. For the first received packet of the second file, the answer in step S34 is NO and the new file operation 400 is performed. In step S41, it is determined that all 7,000 bytes of the second file will fit into the buffer without going past the end of the buffer. In step S46, it is determined that the range of the new file will not overlap any files in the hash table. Therefore, an entry corresponding to the second file is added to the hash table. FIG. 7B shows a state of the hash table after the second file is fully received and, therefore, the entry corresponding to the second file is not labeled incomplete with ".new" at the end of the filename. The first byte of the second file is at byte 5,000,000, which was the location of the Next Start Location pointer prior to receipt of the second file, as shown in FIG. 6A. After allocation of buffer space for the second file, the location of the Next Start Location pointer is moved to the end of the allocated buffer space for the second file, to byte 5,007,000, as shown in FIG. 7A.

The second file "ch4-2-v-init.mp4" is an initialization file (i.e., Initialization Segment) for the video elementary stream component of the service. In some embodiments, to facilitate access to reception apparatuses that may be joining the stream at any time, such initialization files are repeated often in the packet stream. To ensure the availability of the initialization files at all times, in some embodiments, the size of the buffer is set to be large enough to store an initialization file at any given point in time. For example, given the recurrence rate of the initialization file and other factors of the file stream, the size of the buffer can be set to a size such that the previously received initialization file has not yet been overwritten when the next initialization file is received and stored in the buffer. In some embodiments, the receiver may be configured to dynamically vary the buffer size based on the size of incoming broadcast files. In some embodiments, the initialization file may be moved to another part of the memory, thereby ensuring that the initialization file is available at all times and will not be overwritten.

Figures 8A, 8B:
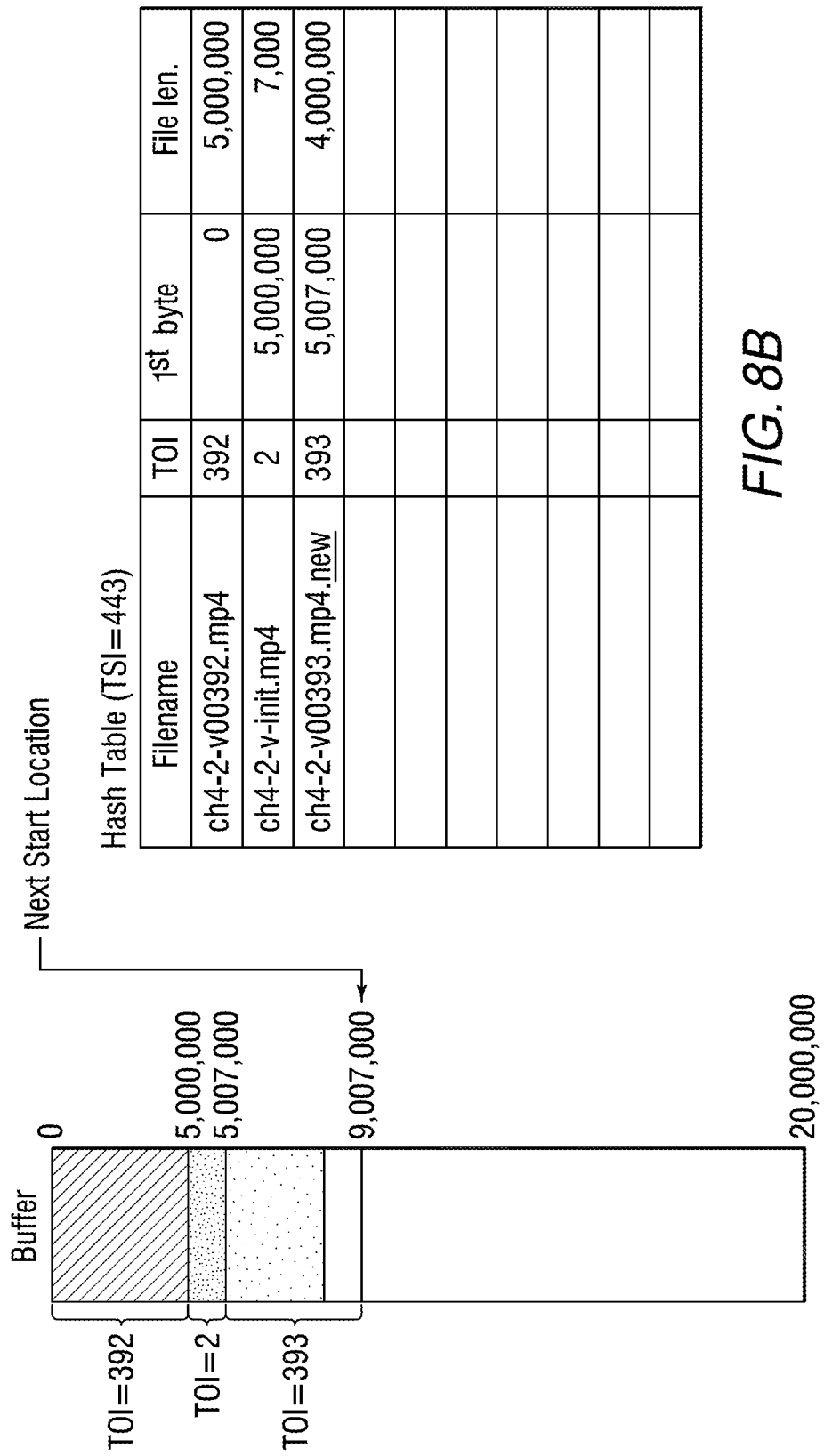
FIGS. 8A and 8B illustrate an exemplary buffer and corresponding hash table.

Next in this exemplary embodiment, packets associated with a third file are discovered in the broadcast stream and processed. The third file is a subsequent video Media Segment named "ch4-2-v00393.mp4." The length is signaled as being 4,000,000 bytes. For the first packet received corresponding to the file ch4-2-v00393.mp4, the determination of step S34 is NO because the hash table is in the state of FIG. 7B and there is no incomplete entry having the same TOI number as the file ch4-2-v00393.mp4. In the new file operation 400, the third file is determined to fit into the remaining space in the buffer in step S41 because the buffer is in the state shown in FIG. 7A and the space between the Next Start Location pointer and the end of the buffer is greater than the 4,000,000 byte length of the third file. It is also determined in step S46 that the range of the new file will not overlap any files in the hash table. FIG. 8B shows the added new entry for the third file indicating that the first byte of the file has been stored at byte 5,007,000, which was the location of the Next Start Location pointer in FIG. 7A prior to reception of the third file.

FIG. 8A shows a state of the buffer in which the area in the buffer (indicated by TOI=393) has been allocated to the new file and location of the Next Start Location has been moved to the end of the allocated area (i.e., to byte 9,007,000). The shaded region of the allocated area indicates a state in which some packets carrying the file have been received and stored in the buffer, but the file is not yet complete.

Accordingly, in the processing of all subsequent (i.e., not first received) packets carrying the third file, an incomplete entry in the hash table having a TOI match is found in step S34 because the hash table of FIG. 8B now includes the incomplete entry for this file. Therefore, the subsequent received packets carrying the third file are stored according to step S36 in the allocated area shown in FIG. 8A.

Next in this exemplary embodiment, packets carrying a repeated instance of the second file (ch4-2-v-init.mp4) are discovered in the LCT Channel (TSI=443) corresponding to the buffer and hash table of the present embodiment. This new file is identified to be a repeat of the second file because its filename is the same as that of the second file and the TSI/TOI values of both files are the same. If the newly received file were an updated version of the second file, the TOI numbers of the files would be different, though the filenames would be the same.

Nevertheless, in one embodiment, process 300 is performed for the first received packet of the new file. The length of the second file is signaled as being 7,000 bytes. For the first received packet of the second file, the answer in step S34 is NO because the hash table entry having the same TOI number (i.e., 2) as the new file is not labeled incomplete, so the new file operation 400 is performed.

As described above, some receiver embodiments require availability of repeated initialization files at all times. In such embodiments, each new copy of the initialization file is received and buffered while removing previously buffered duplicates, as described below. In alternative embodiments, the initialization file may be moved to another section of memory outside of the buffer, to ensure availability of the file. In other embodiments that may not require availability of the initialization file at all times, the duplicate received file is not stored and the previously buffered file corresponding to the hash table entry having the same TOI number is retained. In other embodiments, the duplicate received file is not stored in response to a determination that the received file is not necessary and will not be read by the reception apparatus.

Figures 9A, 9B:
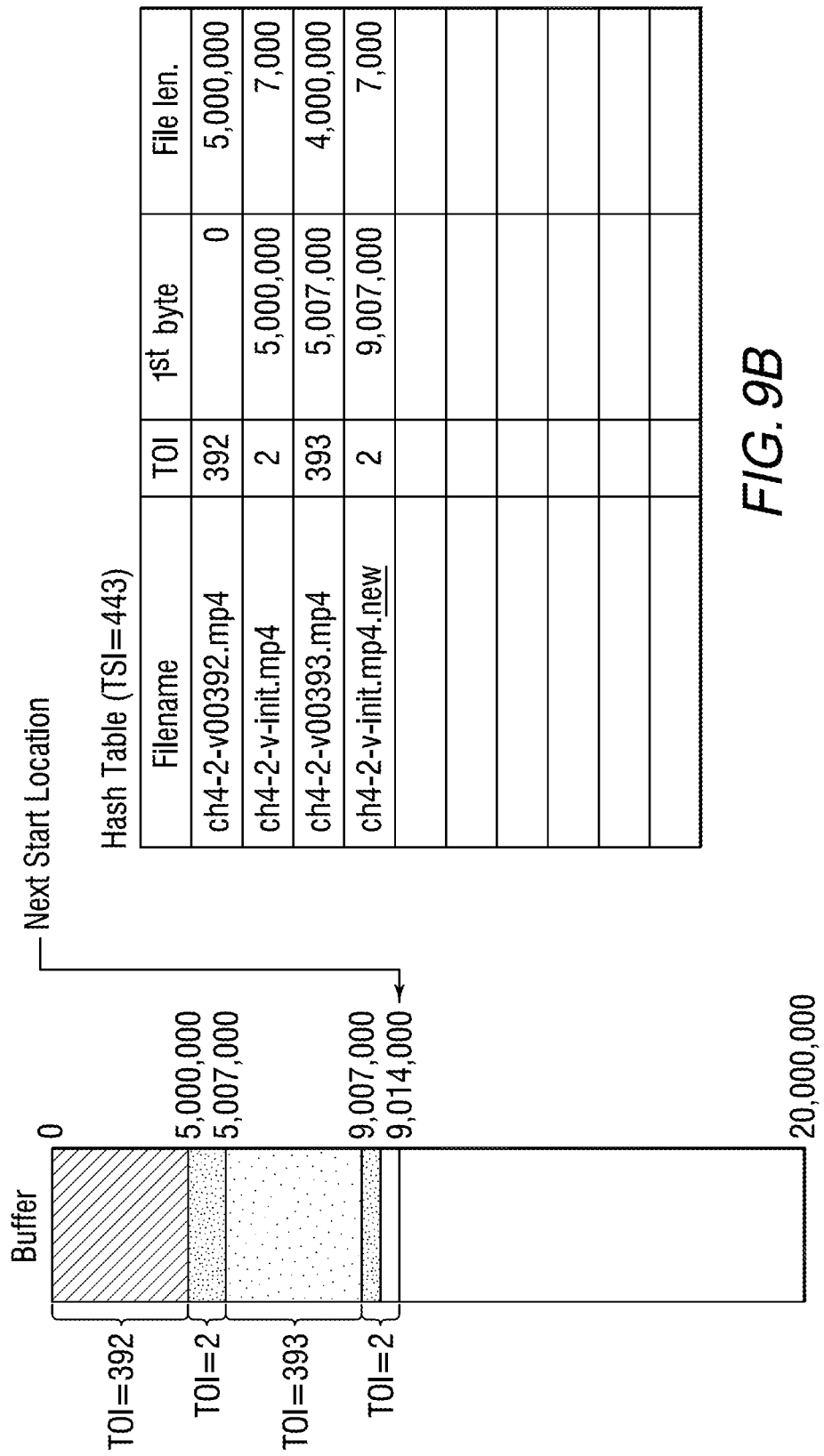
FIGS. 9A and 9B illustrate an exemplary buffer and corresponding hash table.

In step S41, it is determined that all 7,000 bytes of the second file will fit into the buffer without going past the end of the buffer. In step S46, it is determined that the range of the new file does not overlap any files already in the hash table. Therefore, an entry corresponding to the new file is added to the hash table as a fourth entry. FIG. 9B shows a state of the hash table after some packets of the new file have been received, but not all bytes have been received yet and the entry corresponding to the new file is labeled incomplete with ".new" at the end of the filename. The first byte of the new file is at byte 9,007,000, which was the location of the Next Start Location pointer prior to receipt of the second file, as shown in FIG. 8A.

After allocation of buffer space for the new file, the location of the Next Start Location pointer is moved to the end of the allocated buffer space, to byte 9,014,000, as shown in FIG. 9A. At the time the last byte of the repeated ch4-2-v-init.mp4 file is received, each entry in the hash table is checked to determine whether a file with the same name already exists in the hash table and identified earlier entries in the hash table are removed, as described above.

FIG. 10A shows an exemplary embodiment in which the repeated ch4-2-v-init.mp4 file is fully received and stored in the buffer. When the repeated ch4-2-v-init.mp4 file is complete, the second entry in the hash table in FIG. 9B is identified as a duplicate of the newly received file. Accordingly, the first instance of the file is removed, as shown in FIG. 10B. At this point in the exemplary embodiment, should the reception apparatus need to refer to the file ch4-2-v-init.mp4, the hash table will indicate that the file is stored starting at byte 9,007,000 of the buffer and the reception apparatus will refer to the latest received copy of the file.

In FIG. 10A, the area of the buffer that had stored the first copy of the ch4-2-v-init.mp4 file (i.e., the area between byte 5,000,000 and byte 5,007,000) is shown as shaded (as before) to indicate that the bytes of that file remain in the buffer. While the bytes are not erased, there is simply no reference to this area of the buffer in the hash table.

Figures 11A, 11B:
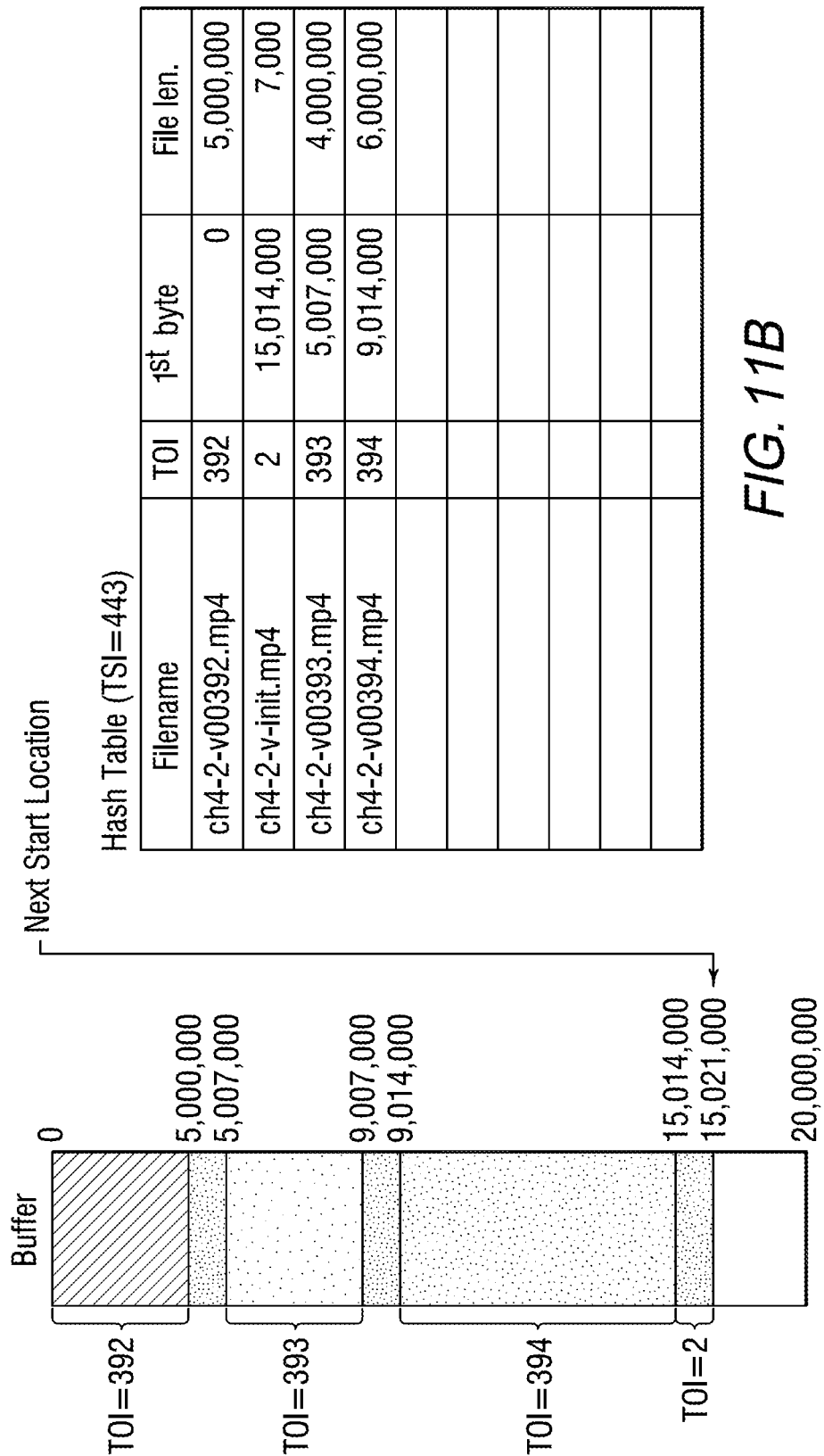
FIGS. 11A and 11B illustrate an exemplary buffer and corresponding hash table.

Next, in the exemplary embodiment of FIGS. 11A and 11B, a third Media Segment file (ch4-2-v00394.mp4) and another Initialization Segment (ch4-2-v-init.mp4) have been received and buffered. As described above, each time a first packet of a new incoming file is encountered, a determination is made in step S41 of the new file operation 400 whether the complete file will fit into the buffer starting at the Next Start Position. As shown in FIG. 11A, these two new files fit in the remaining space in the buffer, so for each of the files the answer at step S41 is YES. The ranges of these files also do not overlap any other files stored in the hash table, so the answer at step S46 is NO. Also, as described above, receiving a repeated Initialization Segment (or any repeated file) involves removal of the entry of the previously received file from the hash table upon complete receipt of the new repeated file. In the present exemplary embodiment, the hash table is not ordered, so entries can be added to and removed from any position in the hash table.

In the exemplary embodiment of FIG. 11A, the buffer is almost full. In this exemplary embodiment, packets of a fourth Media Segment file are found, and the EFDT indicates that the file has a length of 5,500,000 bytes. For the first received packet of the fourth file, the answer in step S34 is NO because there is no entry in the hash table entry having the same name and TOI number (i.e., 395), or just the same TOI number is some embodiments, as the new file, so the new file operation 400 is performed.

In the present exemplary embodiment, however, the determination at step S41 is that the file will not fit into the remaining space in the buffer. This determination is made because the length of the file, which is 5,500,000 bytes, added to the location of the Next Start Location pointer, which in the present embodiment is at 15,021,000 bytes, exceeds the size of the buffer, which is 20,000,000 bytes. As such, the make space operation of step S43 is then performed to make space.

The make space operation starting at step S42 is based on the recognition that the older files in the buffer have outlived their usefulness and can be discarded. In steps S43 and S44, each entry in the hash table is inspected, and entries are deleted if any byte of the corresponding file would overlap the space to be occupied by the incoming file, assuming the incoming file will be stored at an initial write location, and not at the Next Start Location.

In the present exemplary embodiment, the first two Media Segments (TOI=392 and 393) are either fully or partially contained within the first 5,500,000 bytes of the buffer. Therefore, both of these entries in the hash table are identified in step S43 and deleted in step S44. Then, a buffer area starting at the initial write location is allocated for the new file, a new hash table entry is created for the new file, and the reception apparatus can now begin to store packets of the new file, ch4-2-v00395.mp4 starting at the initial write location.

Figures 12A, 12B:
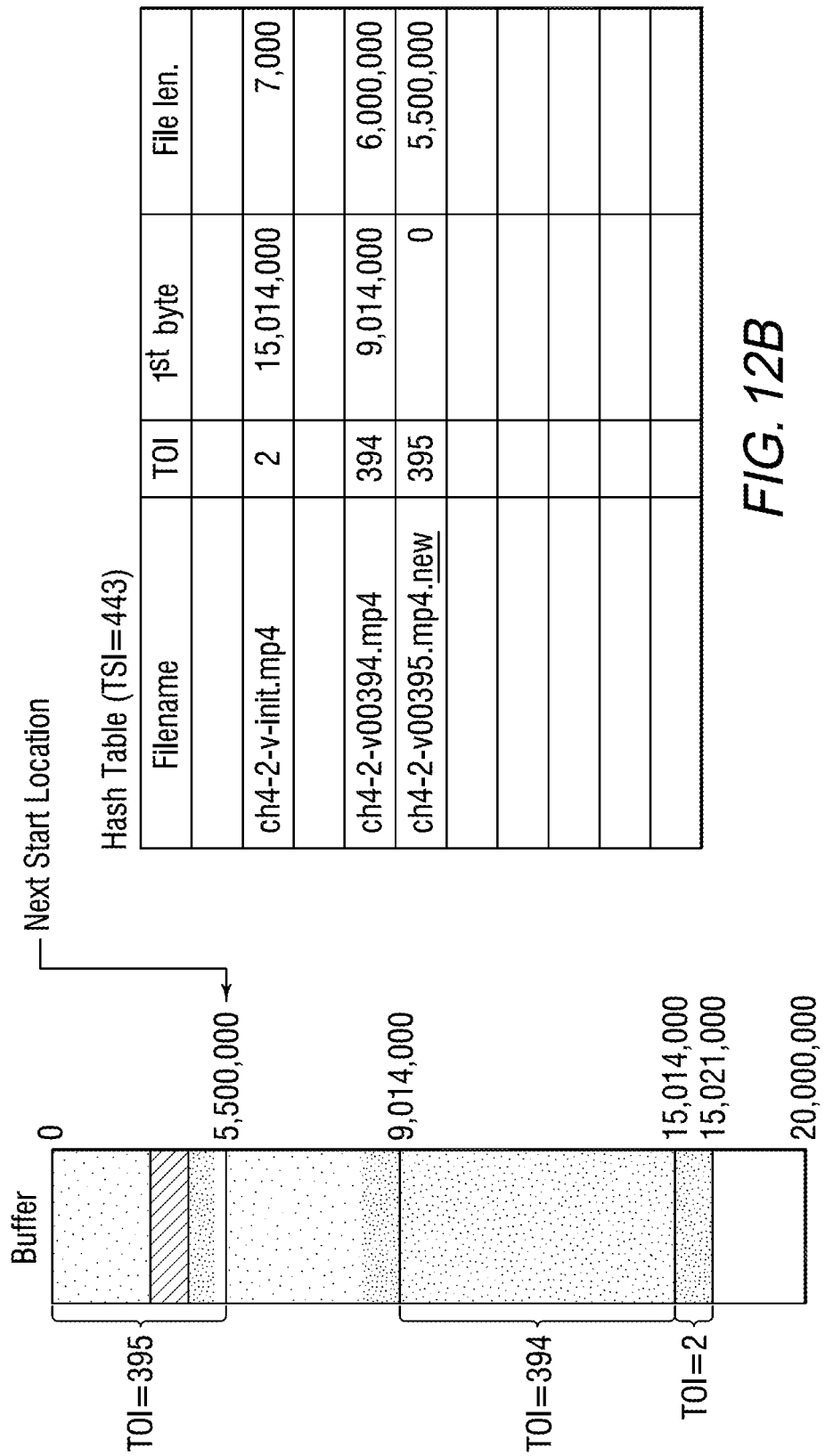
FIGS. 12A and 12B illustrate an exemplary buffer and corresponding hash table.

In the exemplary embodiment of FIG. 12A, the new file is in the process of being received and buffered. FIG. 12A shows some files or portions of files whose hash table entries have been removed to reflect that the bytes of those files exist in the buffer until they are overwritten by a received packet of a new file. FIG. 12B shows a corresponding view of the hash table from which the Media Segment files identified in step S43 have been removed, two previously added files remain (TOI=2 and 394), and the new file ch4-2-v00395.mp4 is indicated as incomplete with a ".new" suffix to the filename.

Figures 13A, 13B:
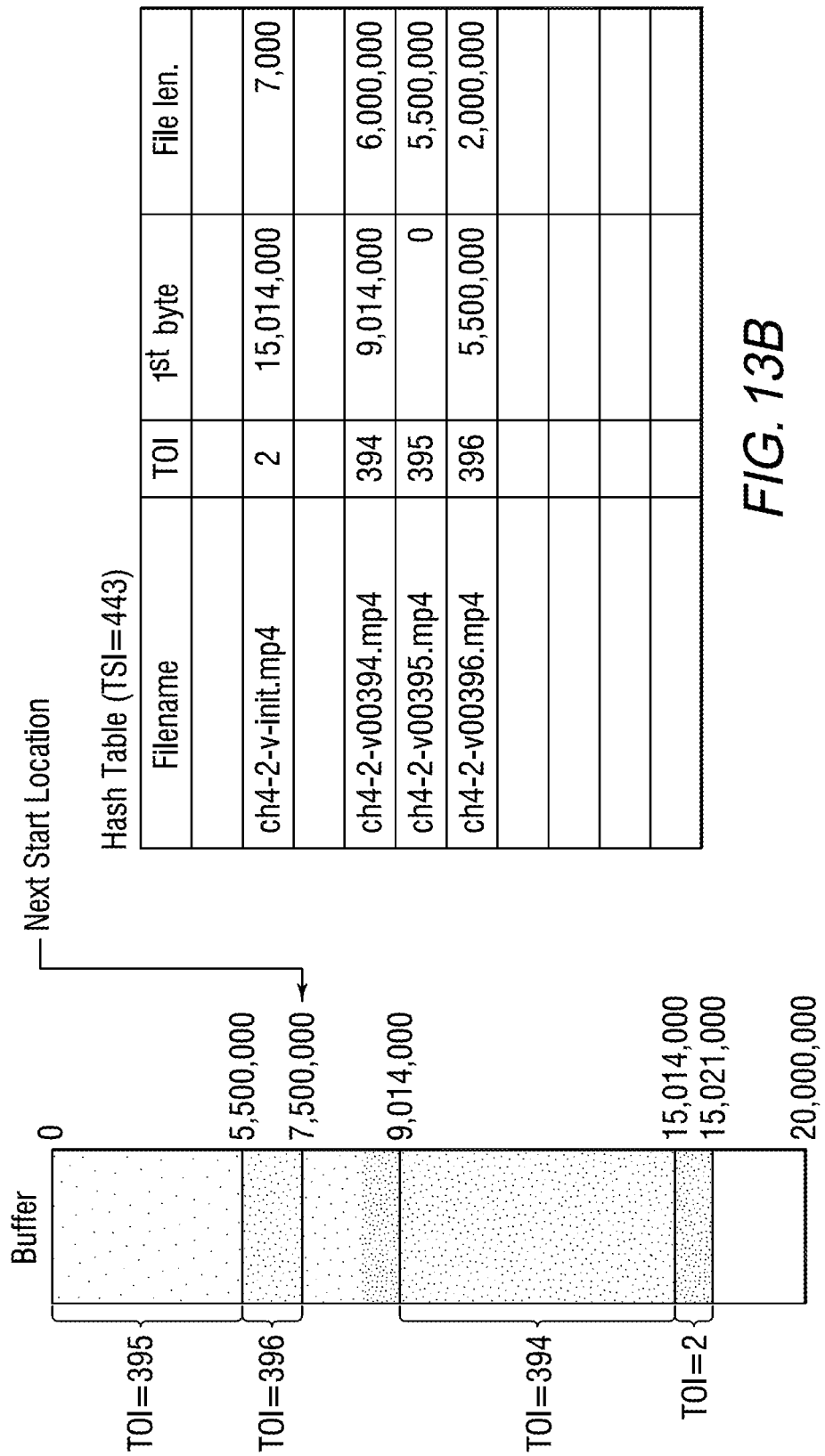
FIGS. 13A and 13B illustrate an exemplary buffer and corresponding hash table.

To continue the example, the exemplary embodiment of FIGS. 13A and 13B shows the arrival of another Media Segment file, this one 2,000,000 bytes long. The new file fits in the buffer space between the Next Start Location pointer at byte 5,500,000 and the end of the buffer, thus the answer at step S41 is YES. Next, it is determined that the new file fits in the buffer space between the Next Start Location pointer at byte 5,500,000 and the start of a file stored at offset 9,014,000, thus the answer in step S46 is NO. FIG. 13A shows the buffer and FIG. 13B shows the hash table after the new file has been fully stored.

Next, in the exemplary embodiment of FIGS. 14A and 14B, a Media Segment file is encountered that is 5,000,000 bytes in length. While this file fits within the buffer (e.g. value of Next Start Location plus 5,000,000 does not exceed 20,000,000), the answer in the determination of step S46 is NO because the range of the file (Next Start Location plus 5,000,000) overlaps the space allocated to file ch4-2-v00394.mp4. Accordingly, file ch4-2-v00394.mp4 is deleted from the hash table in step S50. FIG. 14A shows the buffer as the new file ch4-2-v00397.mp4 is partially stored. FIG. 14B shows the state of the hash table corresponding to FIG. 14A, in which file ch4-2-v00394.mp4 has been removed and new file ch4-2-v00397.mp4 is labeled incomplete.

In summary of the above-described exemplary embodiments, the processing of a received packet corresponding to a file is to first iterate through the entries in the hash table corresponding to the LCT channel of the file and to search for a TOI/filename match. If a match is found and the filename is labeled incomplete, the received packet is stored in its appropriate position within the area of memory that will store that file. The position of the packet is determined by an offset included in the packet indicating the position of the packet relative the beginning of the file. If the packet completes the file stored in the buffer, the "incomplete" label is removed from the entry of the file in the hash table and any previous entries in the hash map corresponding to the same file are deleted. If no TOI/filename match is found, a "begin new file" operation is performed.

The exemplary embodiments of the begin new file operation may be summarized as first determining whether the file will fit into the remaining space in the buffer. The answer will be no if the range of the file, which is the Next Start Location plus the file length, exceeds the size of the buffer, in which case a "make space" operation is performed. Otherwise, the answer is yes. When it is determined that the new file will fit into the remaining space in the buffer, it is determined whether the range of the new file, which is the Next Start Location plus the file length, overlaps any files listed in the hash table. If so, such files are deleted. Then, a new entry is created in the hash table indicating the allocated buffer area of the new file at the Next Start Location, the Next Start Location is moved to the end of the allocated buffer area, and the packet is stored in its corresponding location in the buffer relative to the first byte location of the file. If the packet containing a fragment of the new file does not complete the new file, the new entry created in the hash table is labeled incomplete. When it is determined that the new file will not fit into the remaining space in the buffer, a make space operation is performed.

In the exemplary embodiments, the "make space" operation determines, for each of the entries in the hash table, whether the respective file corresponding to the entry overlaps with the range of the new file, which starts at an initial write location and extends the length of the new file. The buffer area taken up by a given hash table entry can be determined based on the first byte location and file length of the entry.

In the exemplary embodiments of the make space operation, any of the entries in the hash table that are found to overlap with the range of the new file are removed from the hash table, and a buffer area is allocated for the new file starting at the initial write location, including creating an entry in the hash table for the new file. The new entry in the hash table is labeled incomplete if all bytes of the file have not yet been received.

After allocation of the buffer space in the exemplary embodiments of the begin new file operation, the Next Start Location is moved to the end of the allocated buffer space and received packets belonging to the new file are placed in the allocated buffer space according to their offsets, as described above.

The above-described exemplary embodiments of processing incoming packets are capable of properly receiving and buffering a file when the packets of the file are not received in order. For example, some files are broadcast on a "carousel," in which the packets delivering the contents of the file are repeated continuously over time. In such embodiments, a large file might be repeated over the span of five minutes throughout the day. When a reception apparatus first tunes in, the first packet received by the reception apparatus is not likely to include the first byte of the file. However, according to the above-described embodiments, the reception apparatus is still capable of buffering the file even if the first packet received is not the first packet of the file.

This functionality is achieved because each transport packet, per the ATSC A/331 Standard, includes a field in each LCT packet called start_offset. As described above in the exemplary embodiments, the reception apparatus uses this offset field to determine where in the buffer, relative to the location in the buffer of the first byte of the file, the bytes in any packet are to be stored. Accordingly, as packets of the file are received, even if the packets are received out of order, they are placed in the correct order within the buffer area allocated to the file so that the allocated area is eventually filled with the packets and the file is reconstructed in the buffer.

Figure 15:
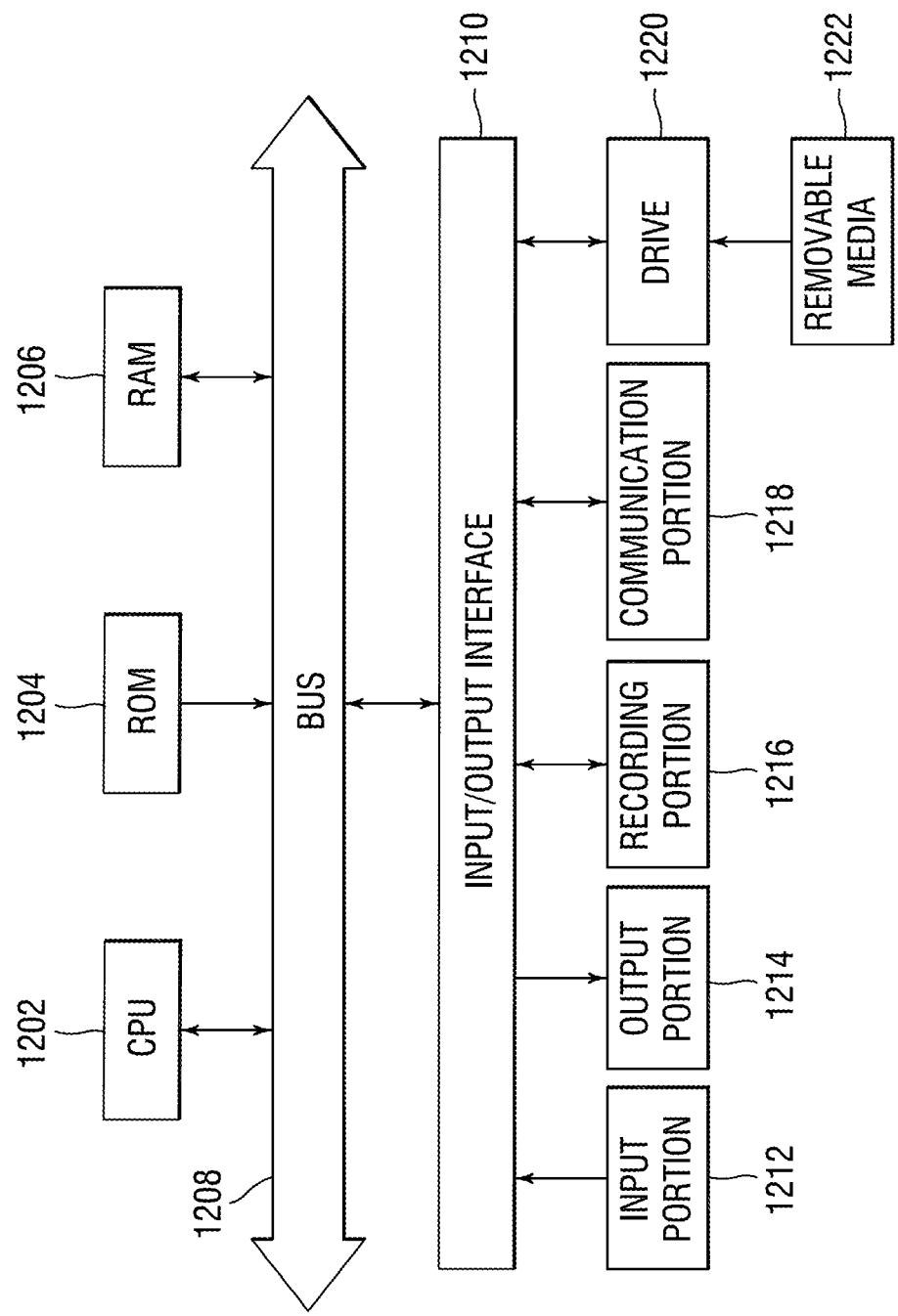
FIG. 15 illustrates an example hardware configuration of a computer.

FIG. 15 is a block diagram showing an example of a hardware configuration of a computer that can be configured to perform functions of any one or a combination of reception apparatus and service distribution system. For example, in one embodiment, the computer is configured to perform one or a combination of the functions described herein with respect to the reception apparatus 120.

As illustrated in FIG. 15, the computer includes a CPU 1202, ROM (read only memory) 1204, and a RAM (random access memory) 1206 interconnected to each other via one or more buses 1208. The one or more buses 1208 are further connected with an input-output interface 1210. The input-output interface 1210 is connected with an input portion 1212 formed by a keyboard, a mouse, a microphone, remote controller, etc. The input-output interface 1210 is also connected to an output portion 1214 formed by an audio interface, video interface, display, speaker and the like; a recording portion 1216 formed by a hard disk, a non-volatile memory or other non-transitory computer readable storage medium; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or a combination of the functions described herein with respect to the reception apparatus 120.

Figure 4:
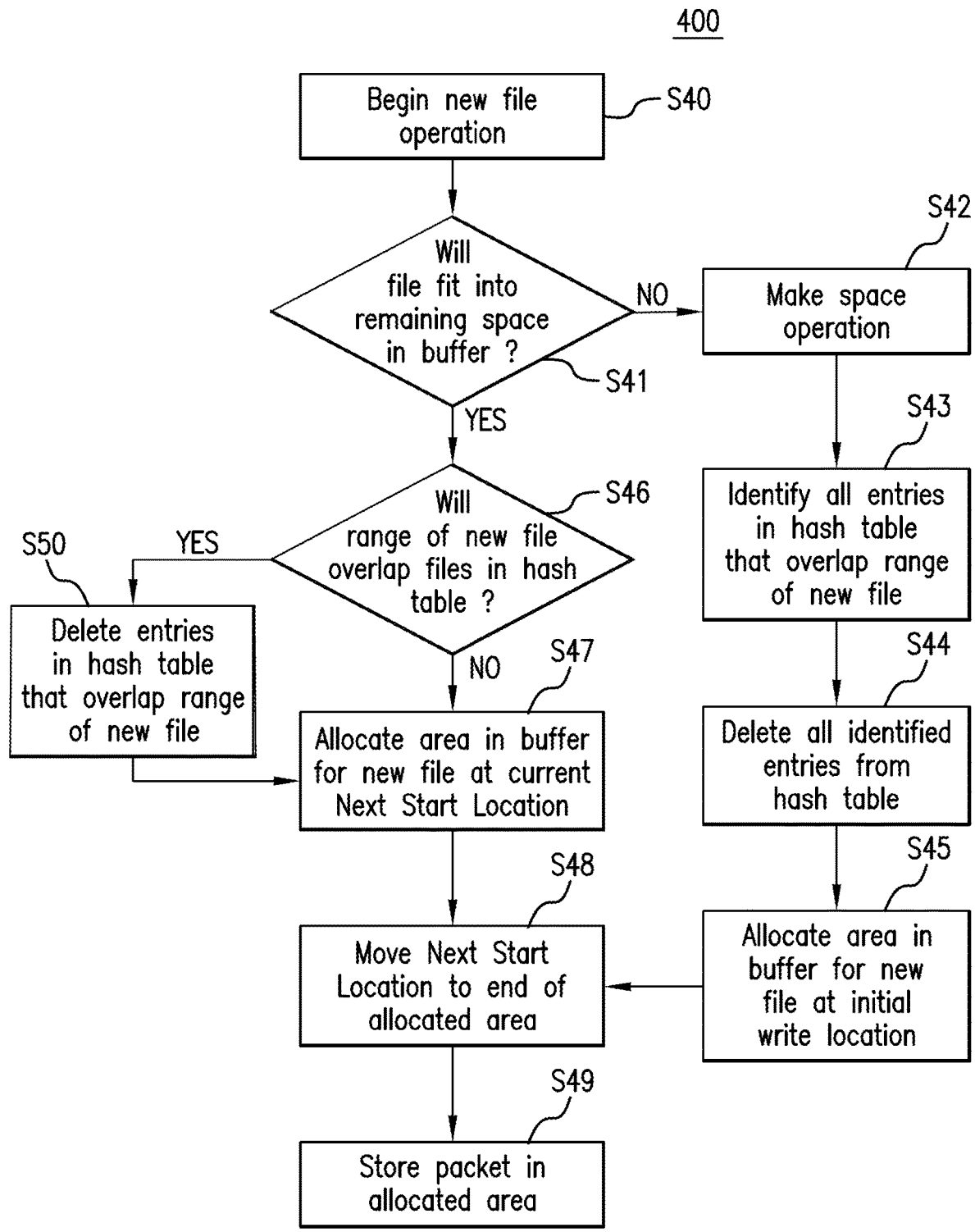
FIG. 4 illustrates an exemplary "begin new file" sub-process performed in the reception apparatus.

The hardware description above, exemplified by any one of the structure examples shown in FIGS. 2 and 15, constitutes or includes specialized corresponding structure that is programmed or configured to perform the algorithm describe above, for example with reference to FIGS. 3 and 4. For example, any one or a combination of the algorithms shown in FIGS. 3 and 4 may be completely performed by the circuitry included in the single device shown in FIG. 2.

Obviously, numerous modifications and variations are possible in light of the above teachings. It is therefore to be understood that within the scope of the appended claims, the present disclosure may be practiced otherwise than as specifically described herein. Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

Embodiments of the present disclosure include significantly advantageous features such as:

(1) A buffering approach optimized for reception of streaming multicast-delivered media data.

(2) Processing is designed with the advantages and limitations of the Java programming language in mind, specifically to avoid the inefficiency and uncertainties related to garbage collection operations that could lead to memory leaks.

(3) Because byte arrays in Java cannot be broken into pieces, processing is optimized to avoid any one file occupying multiple contiguous byte arrays.
  (a) Processing is designed to employ the System.arrayCopy native Android function, which works only on byte arrays, to move blocks of memory efficiently.
  (b) Generally, the processing is optimized for Java on Android.

(4) Optimizations of the processing include:
  (a) Storing files in contiguous areas of the buffer to avoid complexity and CPU overhead incurred if a file is not stored in contiguous memory.
  (b) Avoiding unnecessary copying of files.
  (c) Efficient handling of duplicate files.
  (d) Efficient management of recovery of memory for use in storing newer files.

(5) Processing supports out-of-order packet delivery and carousel file delivery modes.

The above disclosure also encompasses the embodiments listed below.

(1) A method for managing a buffer having a preset byte size for storing files received via packet stream, the method including determining a file identifier and length of an incoming file; determining that the incoming file will not fit into a space between a next write location and an end of the buffer; in response to the determination that the incoming file will not fit into the space between the next write location and the end of the buffer, in a map that identifies one or more files stored in the buffer, deleting each entry corresponding to a file at least partially stored in an area of the buffer starting at an initial write location and having a size equal to the length of the incoming file, adding an entry in the map including the file identifier and the length of the incoming file in association with the initial write location in the buffer, allocating a contiguous area in the buffer starting at the initial write location in the buffer and having the size equal to the length of the incoming file and then moving the next write location to the end of the allocated contiguous area, and receiving packets of the incoming file and storing the received packets into the allocated contiguous area.

(2) The method according to feature (1), in which the packet stream is part of an Advanced Television Systems Committee (ATSC) 3.0 digital television signal.

(3) The method according to feature (1) or (2), in which the incoming file is received in a Layered Coding Transport (LCT) channel having a Transport Session Identifier (TSI) value in common with other files stored in the buffer, and a new buffer and separate map are initialized to store files with a different corresponding TSI value.

(4) The method according to any of features (1) to (3), in which the added entry in the map includes the file identifier and the length of the incoming file.

(5) The method according to any of features (1) to (4), further including labeling the added entry in the map as incomplete until the received packets of the incoming file fill up the contiguous area in the buffer allocated to the file.

(6) The method according to any of features (1) to (5), further including, for each incoming packet of the packet stream, determining a file identifier of a corresponding file; determining whether an entry in the map exists having the file identifier of the corresponding file and being labeled incomplete; in response to a determination that an incomplete entry in the map exists having the file identifier of the corresponding file, storing the incoming packet into the allocated contiguous area associated with the incomplete entry in the map, determining whether the incoming packet completes the file in the allocated contiguous area associated with the incomplete entry in the map, in response to a determination that the incoming packet completes the file in the allocated contiguous area associated with the incomplete entry in the map, removing the incomplete label associated with the entry in the map, removing all other entries in the map having the same file name as the entry in the map, and in response to a determination that no incomplete entry in the map exists having the file identifier of the corresponding file, processing the incoming packet as a new incoming file.

(7) The method according to any of features (1) to (6), in which the file identifier includes a transport object identifier (TOI) and a file name.

(8) A buffer management apparatus for storing files received via packet stream in a buffer having a preset byte size, the buffer management apparatus including circuitry configured to determine a file identifier and length of an incoming file; determine that the incoming file will not fit into a space between a next write location and an end of the buffer; in response to the determination that the incoming file will not fit into the space between the next write location and the end of the buffer, in a map that identifies one or more files stored in the buffer, delete each entry corresponding to a file at least partially stored in an area of the buffer starting at an initial write location and having a size equal to the length of the incoming file, add an entry in the map including the file identifier and the length of the incoming file in association with the initial write location in the buffer, allocate a contiguous area in the buffer starting at the initial write location in the buffer and having the size equal to the length of the incoming file and then move the next write location to the end of the allocated contiguous area, and receive packets of the incoming file and storing the received packets into the allocated contiguous area.

(9) The buffer management apparatus according to feature (8), in which the packet stream is part of an Advanced Television Systems Committee (ATSC) 3.0 digital television signal.

(10) The buffer management apparatus according to feature (8) or (9), in which the incoming file is received in a Layered Coding Transport (LCT) channel having a Transport Session Identifier (TSI) value in common with other files stored in the buffer, and a new buffer and separate map are initialized to store files with a different corresponding TSI value.

(11) The buffer management apparatus according to any of features (8) to (10), in which the added entry in the map includes the file identifier and the length of the incoming file.

(12) The buffer management apparatus according to any of features (8) to (11), in which the circuitry is further configured to label the added entry in the map as incomplete until the received packets of the incoming file fill up the contiguous area in the buffer allocated to the incoming file.

(13) The buffer management apparatus according to any of features (8) to (12), in which the circuitry is further configured to, for each incoming packet of the packet stream, determine a file identifier of a corresponding file; determine whether an entry in the map exists having the file identifier of the corresponding file and being labeled incomplete; in response to a determination that an incomplete entry in the map exists having the file identifier of the corresponding file, store the incoming packet into the allocated contiguous area associated with the incomplete entry in the map, determine whether the incoming packet completes the file in the allocated contiguous area associated with the incomplete entry in the map, in response to a determination that the incoming packet completes the file in the allocated contiguous area associated with the incomplete entry in the map, remove the incomplete label associated with the entry in the map, remove all other entries in the map having the same file name as the entry in the map; and in response to a determination that no incomplete entry in the map exists having the file identifier of the corresponding file, process the incoming packet as a new incoming file.

(14) The buffer management apparatus according to any of features (8) to (13), in which the file identifier includes a transport object identifier (TOI) and a file name.

(15) A non-transitory computer-readable storage medium storing computer-readable instructions thereon, which, when executed by a processor, cause the processor to perform a method for managing a buffer having a preset byte size for storing files received via packet stream, the method including determining a file identifier and length of an incoming file; determining that the incoming file will not fit into a space between a next write location and an end of the buffer; in response to the determination that the incoming file will not fit into the space between the next write location and an end of the buffer, in a map that identifies one or more files stored in the buffer, deleting each entry corresponding to a file at least partially stored in an area of the buffer starting at an initial write location and having a size equal to the length of the incoming file, adding an entry in the map including the file identifier and the length of the incoming file in association with the initial write location in the buffer, allocating a contiguous area in the buffer starting at the initial write location in the buffer and having the size equal to the length of the incoming file and then moving the next write location to the end of the allocated contiguous area, and receiving packets of the incoming file and storing the received packets into the allocated contiguous area.

(16) The non-transitory computer-readable medium according to feature (15), in which the packet stream is part of an Advanced Television Systems Committee (ATSC) 3.0 digital television signal.

(17) The non-transitory computer-readable medium according to feature (15) or (16), in which the incoming file is received in a Layered Coding Transport (LCT) channel having a Transport Session Identifier (TSI) value in common with other files stored in the buffer, and a new buffer and separate map are initialized for files with a different corresponding TSI value.

(18) The non-transitory computer-readable medium according to any of features (15) to (17), in which the added entry in the map includes the file identifier and the length of the incoming file, and the file identifier includes a transport object identifier (TOI) and a file name.

(19) The non-transitory computer-readable medium according to any of features (15) to (18), further including labeling the added entry in the map as incomplete until the received packets of the incoming file fill up the contiguous area in the buffer allocated to the incoming file.

(20) The non-transitory computer-readable medium according to feature (19), further including, for each incoming packet of the packet stream, determining a file identifier of a corresponding file; determining whether an entry in the map exists having the file identifier of the corresponding file and being labeled incomplete; in response to a determination that an incomplete entry in the map exists having the file identifier of the corresponding file, storing the incoming packet into the allocated contiguous area associated with the incomplete entry in the map, determining whether the incoming packet completes the file in the allocated contiguous area associated with the incomplete entry in the map, in response to a determination that the incoming packet completes the file in the allocated contiguous area associated with the incomplete entry in the map, removing the incomplete label associated with the entry in the map, removing all other entries in the map having the same file name as the entry in the map, and in response to a determination that no incomplete entry in the map exists having the file identifier of the corresponding file, processing the incoming packet as a new incoming file.

The invention claimed is:

1. A method for managing a buffer having a preset byte size for storing files received via packet stream, the method comprising:
   determining a file identifier and length of an incoming file;
   determining that the incoming file will not fit into a space between a next write location and an end of the buffer;
   in response to the determination that, the incoming file will not fit into he space between the next write location and the end of the buffer,
      in a map that identifies one or more files stored in the buffer, deleting each entry corresponding to a file at least partially stored in an area of the buffer starting at a start of the buffer and having a size equal to the length of the incoming file that was determined not to fit into the space between the next write location and the end of the buffer,
      adding an entry in the map including the file identifier and the length of the incoming file in association with the start of the buffer, the added entry including a label indicating that the incoming file is incomplete,
      allocating a contiguous area in the buffer starting at the start of the buffer and having the size equal to the length of the incoming file and then moving the next write location to the end of the allocated contiguous area, and
      receiving packets of the incoming file and storing the received packets into the allocated contiguous area.

2. The method according to claim 1, wherein the packet stream is part of an Advanced Television Systems Committee (ATSC) 3.0 digital television signal.

3. The method according to claim 2, wherein
   the incoming file is received in a Layered Coding Transport (LCT) channel having a Transport Session Identifier (TSI) value in common with other files stored in the buffer, and
   a new buffer and separate map are initialized to store files with a different corresponding TSI value.

4. The method according to claim 1, further comprising removing the label indicating that the incoming file is incomplete when the received packets of the incoming file fill up the contiguous area in the buffer allocated to the incoming file.

5. The method according to claim 4, further comprising, for each incoming packet of the packet stream,
   determining a file identifier of a corresponding file;
   determining whether an entry in the map exists having the file identifier of the corresponding file and being labeled incomplete;
   in response to a determination that an incomplete entry in the map exists having the file identifier of the corresponding file,
      storing the incoming packet into the allocated contiguous area associated with the incomplete entry in the map;
      determining whether the incoming packet completes the corresponding file in the allocated contiguous area associated with the incomplete entry in the map;
      in response to a determination that the incoming packet completes the corresponding file in the allocated contiguous area associated with the incomplete entry in the map,
         removing the incomplete label associated with the entry in the map;
         removing all other entries in the map having a same file name as the entry in the map; and
   in response to a determination that no incomplete entry in the map exists having the file identifier of the corresponding file, processing the incoming packet as a new incoming file.

6. The method according to claim 5, wherein the file identifier includes a transport object identifier (TOI) and a file name.

7. A buffer management apparatus for storing files received via packet stream in a buffer having a preset byte size, the buffer management apparatus comprising:
   circuitry configured to
      determine a file identifier and length of an incoming file;
      determine that the incoming file will not fit into a space between a next write location and an end of the buffer;
      in response to the determination that the incoming file will not fit into the space between the next write location and the end of the buffer,
         in a map that identifies one or more files stored in the buffer, delete each entry corresponding to a file at least partially stored in an area of the buffer starting at a start of the buffer and having a size equal to the length of the incoming file that was determined not to fit into the space between the next write location and the end of the buffer,
         add an entry in the map including the file identifier and the length of the incoming file in association with the start of the buffer, the added entry including a label indicating that the incoming file is incomplete,
         allocate a contiguous area in the buffer starting at the start of the buffer and having the size equal to the length of the incoming file and then move the next write location to the end of the allocated contiguous area, and
         receive packets of the incoming file and store the received packets into the allocated contiguous area.

8. The buffer management apparatus according to claim 7, wherein the packet stream is part of an Advanced Television Systems Committee (ATSC) 3.0 digital television signal.

9. The buffer management apparatus according to claim 8, wherein
   the incoming file is received in a Layered Coding Transport (LCT) channel having a Transport Session Identifier (TSI) value in common with other files stored in the buffer, and
   a new buffer and separate map are initialized to store files with a different corresponding TSI value.

10. The buffer management apparatus according to claim 7 wherein the circuitry is further configured to removing the label indicating that the incoming file is incomplete when the received packets of the incoming file fill up the contiguous area in the buffer allocated to the incoming file.

11. The buffer management apparatus according to claim 10, wherein the circuitry is further configured to, for each incoming packet of the packet stream,
   determine a file identifier of a corresponding file;
   determine whether an entry in the map exists having the file identifier of the corresponding file and being labeled incomplete;
   in response to a determination that an incomplete entry in the map exists having the file identifier of the corresponding file,
      store the incoming packet into the allocated contiguous area associated with the incomplete entry in the map;
      determine whether the incoming packet completes the corresponding file in the allocated contiguous area associated with the incomplete entry in the map;
      in response to a determination that the incoming packet completes the corresponding file in the allocated contiguous area associated with the incomplete entry in the map,
         remove the incomplete label associated with the entry in the map;
         remove all other entries in the map having a same file name as the entry in the map; and
   in response to a determination that no incomplete entry in the map exists having the file identifier of the corresponding file, process the incoming packet as a new incoming file.

12. The buffer management apparatus according to claim 11, wherein the file identifier includes a transport object identifier (TOT) and a file name.

13. A non-transitory computer-readable storage medium storing computer-readable instructions thereon, which, when executed by a processor, cause the processor to perform a method for managing a buffer having a preset byte size for storing files received via packet stream, the method comprising:
   determining a file identifier and length of an incoming file;
   determining that the incoming file will not fit into a space between a next write location and an end of the buffer;
   in response to the determination that the incoming file will not fit into the space between the next write location and the end of the buffer,
      in a map that identifies one or more files stored in the buffer, deleting each entry corresponding to a file at least partially stored in an area of the buffer starting at a start of the buffer and having a size equal to the length of the incoming file that was determined not to fit into the space between the next write location and the end of the buffer, adding an entry in the map including the file identifier and the length of the incoming file in association with the start of the buffer, the added entry including a label indicating that the incoming file is incomplete, allocating a contiguous area in the buffer starting at the start of the buffer and having the size equal to the length of the incoming file and then moving the next write location to the end of the allocated contiguous area, and receiving packets of the incoming file and storing the received packets into the allocated contiguous area.

14. The non-transitory computer-readable medium according to claim 13, wherein the packet stream is part of an Advanced Television Systems Committee (ATSC) 3.0 digital television signal.

15. The non-transitory computer-readable medium according to claim 14, wherein the incoming file is received in a Layered Coding Transport (LCT) channel haying a Transport Session Identifier (TSI) value in common with other files stored in the buffer, and a new buffer and separate map are initialized for files with a different corresponding TSI value.

16. The non-transitory computer-readable medium according to claim 13, wherein the file identifier includes a transport object identifier (TOI) and a file name.

17. The non-transitory computer-readable medium according to claim 16, further comprising removing the label indicating that the incoming file is incomplete when the received packets of the incoming file fill up the contiguous area in the buffer allocated to the incoming file.

18. The non-transitory computer-readable medium according to claim 17, further comprising, for each incoming packet of the packet stream, determining a file identifier of a corresponding file;

determining whether an entry in the map exists having the file identifier of the corresponding file and being labeled incomplete;

in response to a determination that an incomplete entry in the map exists having the file identifier of the corresponding file, storing the incoming packet into the allocated contiguous area associated with the incomplete entry in the map;

determining whether the incoming packet completes the corresponding file in the allocated contiguous area associated with the incomplete entry in the map;

in response to a determination that the incoming packet completes the corresponding file in the allocated contiguous area associated with the incomplete entry in the map, removing the incomplete label associated with the entry in the map;

removing all other entries in the map having a same file name as the entry in the map; and in response to a determination that no incomplete entry in the map exists having the file identifier of the corresponding file, processing the incoming packet as a new incoming file.

\* \* \* \* \*